(12) United States Patent
Moon et al.

(10) Patent No.: US 9,887,722 B2
(45) Date of Patent: Feb. 6, 2018

(54) ELECTRONIC DEVICE

(71) Applicant: Samsung Electronics Co., Ltd., Gyeonggi-do (KR)

(72) Inventors: Heecheul Moon, Gyeonggi-do (KR); Uyhyeon Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/287,339

(22) Filed: Oct. 6, 2016

(65) Prior Publication Data
US 2017/0099072 A1 Apr. 6, 2017

(30) Foreign Application Priority Data
Oct. 6, 2015 (KR) .................. 10-2015-0140636

(51) Int. Cl.
| | | |
|---|---|---|
| *H04B 1/38* | (2015.01) | |
| *H04M 1/00* | (2006.01) | |
| *H04B 1/3877* | (2015.01) | |
| *H04B 1/3888* | (2015.01) | |
| *H04M 1/02* | (2006.01) | |

(52) U.S. Cl.
CPC ......... *H04B 1/3877* (2013.01); *H04B 1/3888* (2013.01); *H04M 1/0266* (2013.01)

(58) Field of Classification Search
CPC .................................................. H04B 1/3877
USPC ........................................................ 455/566
See application file for complete search history.

(56) References Cited

U.S. PATENT DOCUMENTS

| | | | | |
|---|---|---|---|---|
| 6,262,785 | B1 * | 7/2001 | Kim ..................... | G06F 1/1601 345/903 |
| 2010/0157553 | A1 * | 6/2010 | Hirota ................. | H04M 1/0214 361/752 |
| 2012/0026713 | A1 * | 2/2012 | Aubin ................. | G11B 33/124 361/807 |
| 2012/0044620 | A1 | 2/2012 | Song et al. | |

(Continued)

OTHER PUBLICATIONS

International Search Report dated Jan. 9, 2017 issued in counterpart application No. PCT/KR2016/010917, 3 pages.

*Primary Examiner* — Tilahun B Gesesse
(74) *Attorney, Agent, or Firm* — The Farrell Law Firm, P.C.

(57) ABSTRACT

An electronic device is provided. The electronic device includes a foldable housing configured to be folded in a first direction or a second direction opposite to the first direction about a connection part, wherein the foldable housing includes a first housing part including a first surface and a second surface opposite to the first surface, a second housing part including a first surface facing the first surface of the first housing part in a state folded in the first direction and a second surface facing the second surface of the first housing part in a state folded in the second direction, and a flexible connection part that connects at least a portion of one side of the first housing part and at least a portion of one side of the second housing part; a first display configured at the first surface of the first housing part; and a second display configured at the first surface of the second housing part, wherein the connection part includes at least one polymer layer in which the first surface of the first housing part and the first surface of the second housing part are formed to maintain at least one angle of a selected range in a state in which an external force to the foldable housing is not applied.

18 Claims, 40 Drawing Sheets

(56) References Cited

U.S. PATENT DOCUMENTS

| | | | |
|---|---|---|---|
| 2012/0176736 A1* | 7/2012 | Apgar | B32B 25/10 361/679.01 |
| 2013/0342090 A1 | 12/2013 | Ahn et al. | |
| 2015/0153786 A1 | 6/2015 | Oakley | |
| 2015/0233162 A1 | 8/2015 | Lee et al. | |
| 2015/0277506 A1* | 10/2015 | Cheah | G06F 1/1681 361/679.27 |
| 2015/0281414 A1* | 10/2015 | Michino | H04M 1/0216 455/575.3 |

* cited by examiner (a)          (b)

ELECTRONIC DEVICE

PRIORITY

This application claims priority under 35 U.S.C. § 119(a) to a Korean Patent Application filed on Oct. 6, 2015 in the Korean Intellectual Property Office and assigned Serial No. 10-2015-0140636, the entire disclosure of which is incorporated herein by reference.

BACKGROUND

1. Field of the Disclosure

The present disclosure relates generally to an electronic device, and more particularly, to an electronic device that can maintain an angle between two displays without using a hinge.

2. Description of the Related Art

Electronic devices may include various kinds of displays. While displays are mounted that may provide various functions, in order to secure portability by reducing thickness and weight, the external forms of electronic devices have gradually become simpler and the use pattern thereof has also become simpler.

In an existing electronic device, if connecting two displays, the two displays are connected using a hinge such as a biaxial hinge; thus, if the two displays are folded, there is a problem that the thickness of the electronic device increases because of the thickness of the hinge. Further, product design of an electronic device is restricted because of a hinge.

SUMMARY

An aspect of the present disclosure provides an electronic device that can maintain a predetermined angle between two displays without using a hinge.

Another aspect of the present disclosure provides a connection part that includes a first polymer layer, a second polymer layer, and a third polymer layer disposed between the first polymer layer and the second polymer layer, where the third polymer layer is a thermosetting polymer.

Another aspect of the present disclosure provides a third polymer layer that has a thickness of about 0.1 mm to 0.3 mm.

Another aspect of the present disclosure provides a connection part that includes a first surface to which a tensile force is applied and a second surface to which a compressive force is applied in a state in which an external force to a foldable housing is not applied, and the tensile force applied to the first surface and the compressive force applied to the second surface are in equilibrium, if a first surface of a first housing part and a first surface of a second housing part maintain at least one angle.

Another aspect of the present disclosure provides an electronic device that includes a fixing member disposed in a first state or a second state in at least a portion of a connection part.

Another aspect of the present disclosure provides a fixing member disposed in at least a portion of a connection part that is detachably attached to at least a portion of the connection part.

Another aspect of the present disclosure, in a state in which an external force to a foldable housing is not applied, provides a first surface of a first housing part and a first surface of a second housing part that are maintained at a first angle, if a fixing member is disposed at a connection part in a first state, and the first surface of the first housing part and the first surface of the second housing part are maintained at a second angle, if the fixing member is disposed at a connection part in a second state.

Another aspect of the present disclosure provides a first angle that is at least one angle of angles of a selected range.

Another aspect of the present disclosure provides a second angle that is greater than a first angle.

Another aspect of the present disclosure provides a connection part that includes a first surface to which a support force by a fixing member is applied and a second surface to which a restoring force is applied to maintain an at least one angle, and a support force that is applied to a first surface of a connection part and a restoring force that is applied to a second surface of the connection part that are in equilibrium, if a first surface of a first housing part and a first surface of a second housing part maintain a predetermined angle.

Another aspect of the present disclosure, in a state in which a foldable housing is unfolded, provides a connection part that includes a first surface facing in a same direction as that of a first surface of a first housing part and a first surface of a second housing part; and a second surface opposite to a first surface, wherein a predetermined angle is maintained by a first surface of the first housing part and the first surface of the second housing part is determined according to a width of a fixing member disposed at the first surface of the connection part.

Another aspect of the present disclosure provides a width of a fixing member disposed at a first surface of a connection part that is about 8 mm to 15 mm.

Another aspect of the present disclosure provides a fixing member that includes a clip portion disposed at one side of a connection part and a ring portion connected to the clip portion to be inserted between one side of a first housing part and one side of a second housing part such that a first surface of the first housing part and a first surface of the second housing part maintain a predetermined angle.

Another aspect of the present disclosure provides a fixing member that includes a rotation portion that rotates between one side of a first housing part and one side of a second housing part such that a first surface of the first housing part and a first surface of the second housing part maintain a predetermined angle and a fastening portion fixes the rotation portion to a connection part.

Another aspect of the present disclosure provides a rotation portion that automatically rotates according to an angle in which a foldable housing is unfolded.

Another aspect of the present disclosure provides an angle of a selected range is about 90° to about 180°.

Another aspect of the present disclosure provides an angle of a selected range that is about 120° to about 150°.

Another aspect of the present disclosure provides that at least one polymer layer includes a first surface facing in a direction as that of a first surface of a first housing part and a first surface of a second housing part; and a second surface facing in a direction opposite to the first surface, if a foldable housing is unfolded, and wherein a first surface of at least one polymer layer includes a first plurality of wrinkles extended along at least a portion of one side of the first housing part and/or at least a portion of one side of the second housing part.

Another aspect of the present disclosure provides a second surface of at least one polymer layer that includes a second plurality of wrinkles extended along at least a portion of one side of a first housing part and/or at least a portion of one side of a second housing part, wherein a first plurality of wrinkles are formed more densely than the second plurality of wrinkles.

Another aspect of the present disclosure, in a state in which a foldable housing is unfolded, provides a connection part that includes a first surface facing in a direction as that of a first surface of a first housing part and a first surface of a second housing part; and a second surface opposite to the first surface, wherein a predetermined angle is maintained by the first surface of the first housing part and the first surface of the second housing part is determined according to a width of a fixing member disposed at a first surface of the connection part.

Another aspect of the present disclosure provides two displays that can maintain a predetermined angle without using a hinge.

Another aspect of the present disclosure provides an electronic device with a thickness that does not increase by a structure of a hinge, because a first display and a second display may be connected without using a hinge, if the first display and the second display are folded.

Another aspect of the present disclosure, in a state in which two displays maintain a predetermined angle without using a hinge, even in a case in which an external force of a predetermined strength is applied, provides an angle between a first display and a second display that may be maintained continuously at a predetermined angle.

Another aspect of the present disclosure provides an improvement to a manipulation ability and a concentration level of a user using an electronic device, wherein a durability of a connection part between a first display and a second display may be maintained.

In accordance with an aspect of the present disclosure, an electronic device is provided. The electronic device includes a foldable housing configured to be folded in a first direction or a second direction opposite to the first direction about a connection part, wherein the foldable housing includes a first housing part including a first surface and a second surface opposite to the first surface, a second housing part including a first surface facing the first surface of the first housing part in a state folded in the first direction and a second surface facing the second surface of the first housing part in a state folded in the second direction, and a flexible connection part that connects at least a portion of one side of the first housing part and at least a portion of one side of the second housing part; a first display configured at the first surface of the first housing part; and a second display configured at the first surface of the second housing part, wherein the connection part includes at least one polymer layer in which the first surface of the first housing part and the first surface of the second housing part are formed to maintain at least one angle of a selected range in a state in which an external force to the foldable housing is not applied.

In accordance with another aspect of the present disclosure, an electronic device having a foldable housing is provided. The electronic device includes the foldable housing including a first housing part including a first surface and a second surface opposite to the first surface, a second housing part including a first surface facing in a same direction as that of the first surface of the first housing part and a second surface opposite to the first surface in a state in which the foldable housing is unfolded, and a flexible connection part that connects the first housing part and the second housing part; a first display configured at the first surface of the first housing part; a second display configured at the first surface of the second housing part; and a fixing member disposed at the flexible connection part such that the first surface of the first housing part and the first surface of the second housing part maintain a predetermined angle in a state in which an external force to the foldable housing is not applied.

In accordance with another aspect of the present disclosure, a fixing member is provided. The fixing member includes a clip portion disposed at one side of a connection part; and a ring portion connected to the clip portion to be inserted between one side of a first housing part and one side of the second housing part such that a first surface of the first housing part and a first surface of the second housing part maintain a predetermined angle.

In accordance with another aspect of the present disclosure, a fixing member is provided. The fixing member includes a rotation portion configured to rotate between one side of a first housing part and one side of a second housing part such that a first surface of the first housing part and a first surface of the second housing part maintain a predetermined angle; and a fastening portion that fixes the rotation portion to a connection part.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF EMBODIMENTS OF THE PRESENT DISCLOSURE

Figure 1A:
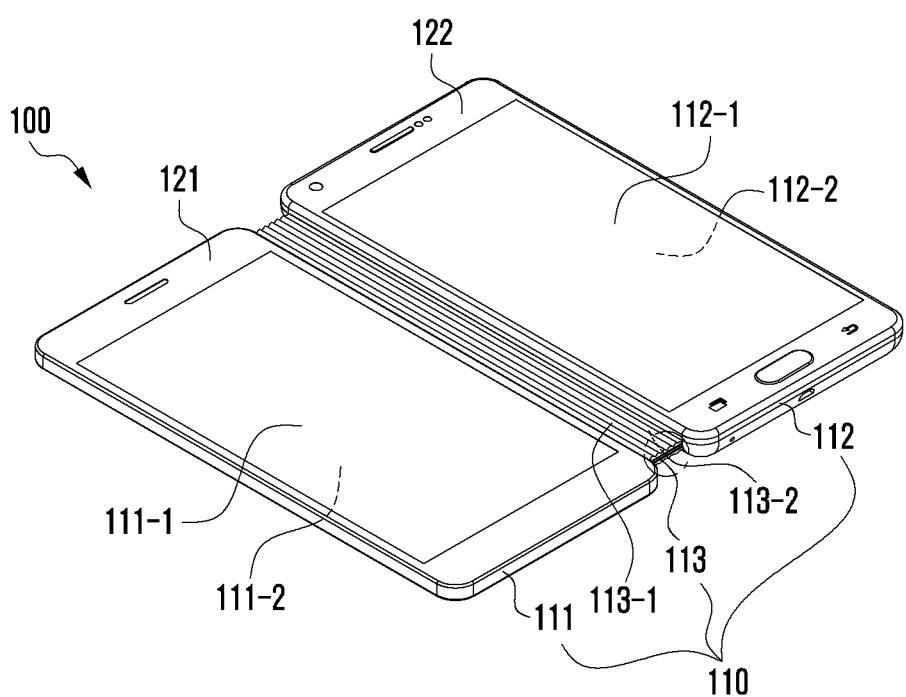
FIGS. 1A and 1B are a perspective view and a partial view, respectively, of an electronic device in an unfolded state according to an embodiment of the present disclosure.

Embodiments of the present disclosure are described in detail with reference to the accompanying drawings. Various changes may be made to the present disclosure, and the present disclosure may have various forms, such that embodiments of the present disclosure are illustrated in the accompanying drawings and described below in detail. However, an embodiment of the present disclosure is not intended to limit the present disclosure and it is intended that the resent disclosure include all changes, equivalents, and substitutions within the scope and spirit of the present disclosure as defined by the appended claims and their equivalents. Throughout the accompanying drawings, like reference numerals refer to like components.

It will be understood that the expressions "comprises" and "may comprise" are used to specify the presence of a disclosed function, operation, component, etc. but do not preclude the presence of one or more additional functions, operations, components, etc. It will be further understood that the terms "comprises" and/or has if used in the present disclosure, specify the presence of a stated feature, number, step, operation, component, element, or a combination thereof but do not preclude the presence of one or more additional features, numbers, steps, operations, components, elements, or combinations thereof. In the present disclosure, the expression "and/or" is intended to be taken as a specific disclosure of each and any combination of enumerated things. For example, "A and/or B" is intended to be taken as a specific disclosure of each of A, B, and A and B.

As used herein, terms such as "first," "second," etc. are used to describe various components, however, it is obvious that the components should not be defined by these terms. For example, the terms do not restrict the order and/or importance of the corresponding components. The terms are used only for distinguishing one component from another component. For example, a first component may be referred to as a second component and, likewise, a second component may be referred to as a first component, without departing from the scope and spirit of the present disclosure.

It will be understood that if an element or layer is referred to as being "on," "connected to" or "coupled to" another element or layer, it may be directly on, connected or coupled to the other element or layer or intervening elements or layers may be present. In contrast, if an element is referred to as being "directly on," "directly connected to" or "directly coupled to" another element or layer, there are no intervening elements or layers present.

The terms used herein is for the purpose of describing predetermined embodiments of the present disclosure only and are not intended to limit the present disclosure. As used herein, the singular forms "a," "an," and "the" are intended to include the plural forms as well, unless the context clearly indicates otherwise.

Unless otherwise defined herein, all terms used herein have the same meanings as commonly understood by those skilled in the art to which the present disclosure belongs. It will be further understood that terms, such as those defined in commonly used dictionaries, should be interpreted as having meanings that are consistent with their meanings in the context of the present and relevant art and should not be interpreted in an idealized or overly formal sense unless expressly so defined herein.

According to an embodiment of the present disclosure, an electronic device may include devices having an operation support function. Examples of an electronic device may include a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), a moving picture experts group audio layer 3 (MP3) player, a mobile medical appliance, a camera, a wearable device (e.g. a head-mounted device (HMD) such as electronic glasses, electronic clothing, an electronic bracelet, an electronic necklace, an electronic appcessory, an electronic tattoo, a smartwatch, etc.

According to an embodiment of the present disclosure, an electronic device may be one of a smart home appliance having an operation support function. Examples of a smart electronic appliance include a television, a digital video disk (DVD) player, an audio player, a refrigerator, an air-conditioner, a vacuum cleaner, an electronic oven, a microwave oven, a washing machine, an air cleaner, a set-to box, a TV box (e.g., Samsung HomeSync®, Apple TV®, and Google TV™), a game console, an electronic dictionary, an electronic key, a camcorder, an electronic frame, etc.

According to an embodiment of the present disclosure, examples of an electronic device may include a medical device (e.g. a magnetic resonance angiography device (MRA), a magnetic resonance imaging device (MRI), a computed tomography device (CT)), a navigation device, a global positioning system (GPS) receiver, an event data recorder (EDR), a flight data recorder (FDR), a car infotainment device, a maritime electronic device (e.g., a maritime navigation device and a gyro compass), an aviation electronic device (avionics), a security device, a vehicle head unit, an industrial or home robot, an automated teller machine (ATM) of a financial institution, a point of sale device (POS), etc.

According to an embodiment of the present disclosure, examples of an electronic device may include furniture and a building/structure having a communication function, an electronic board, an electronic signature receiving device, a projector, and a metering device (e.g., water, electric, gas, and electric wave metering devices). An electronic device may be any combination of the aforementioned devices. An electronic device may be a flexible device. It is obvious to those skilled in the art that an electronic device is not limited to the aforementioned devices.

Electronic devices according to various embodiments of the present disclosure are described below with reference to the accompanying drawings. The term "user" used in various embodiments of the present disclosure may denote a person or a device (e.g. an electronic device that includes artificial intelligence) using an electronic device.

Figure 1B:
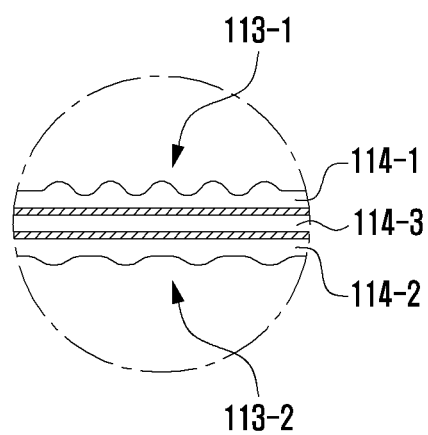

FIGS. 1A and 1B are a perspective view and a partial view, respectively, of an electronic device in an unfolded state according to an embodiment of the present disclosure.

Referring to FIGS. 1A and 1B, an electronic device 100 according to an embodiment of the present disclosure may include a first display 121, a second display 122, and foldable housing 110. The foldable housing 110 may include a first housing part 111, a second housing part 112, and a connection part 113 that connects the first housing part 111 and the second housing part 112. The first housing part 111 may include a first surface 111-1 and a second surface 111-2 opposite to the first surface 111-1, and the second housing part 112 may include a first surface 112-1 and a second surface 112-2 opposite to the first surface 112-1.

At the first surface 111-1 of the first housing part 111, the first display 121 may be disposed. The first display 121 at the first surface 111-1 may be disposed to be detached from the first surface 111-1, fixed to the first surface 111-1 such that the first display 121 cannot be detached from the first surface 111-1, or integrally formed with the first surface 111-1 in a module. For example, if the first housing part 111 includes a partition formed along an outer circumferential surface, the first display 121 may be inserted into the partition to be mounted in the first housing part 111. In this case, the partition may be continuously formed; thus, the first display 121 may be inserted thereto, and in a state in which a plurality of partitions are separated, the first display 121 may be inserted thereto.

According to an embodiment of the present disclosure, the first display 121 and the second display 122 are separate displays and may independently perform a display function, and the first display unit 121 and the second display unit 122 are electrically connected through a printed circuit board to be interlocked. In this case, at least a portion of the printed circuit board may be inserted into the connection part 113.

According to an embodiment of the present disclosure, the second display 122 may include a display device such as a light emitting diode (LED) as well as a display module and may be a function portion including at least one of an input device such as a keypad and a touchpad, an audio device such as a speaker module and a microphone, a power device such as a wireless charge pad and a solar cell, a sensor necessary for sensing an external environment such as a fingerprint sensor and a gas sensor, and antenna devices such as a near field communication (NFC) device.

In the foregoing embodiments of the present disclosure, the first display 121 and the second display 122 have different configurations; but each display does not indicate a predetermined display, and in order to avoid unnecessary description duplication, a description of the first display 121 may be applied to the second display 122 and a description applied to the second display unit 122 may be applied to the first display 121.

The connection part 113 included in the foldable housing 110 may be formed with a polymer layer. The polymer layer may include a first polymer layer 114-1, a second polymer layer 114-2, and a third polymer layer 114-3 disposed between the first polymer layer 114-1 and the second polymer layer 114-2. At least a portion of the first, second, and third polymer layers 114-1, 114-2, and 114-3 may have a flat form, a wrinkled form such as that of corrugated cardboard, or a form in which embossing is formed.

Each of the first, second, and third polymer layers 114-1, 114-2, and 114-3 may be bonded by an adhesive, for example a hot-melt adhesive to be bonded while being heat-melted.

The third polymer layer 114-3 is a thermosetting polymer and may be formed with, for example, an ethylene homopolymer or an ethylene-α-olefin copolymer whose density is 950 kg/m$^3$ or more and whose weight-average molecular weight Mw/number-average molecular weight Mn is 5-15 and in which a content of α-olefin with carbon numbers 3-6 is less than 2 wt %.

Further, the third polymer layer 114-3 may be formed by a process of obtaining a disc film including an ethylene homopolymer whose density is 940 kg/m$^3$ or more and whose weight-average molecular weight Mw/number-average molecular weight Mn is 5-20 or an ethylene-α-olefin copolymer in which a content of α-olefin with carbon numbers 3-6 is less than 2 wt % and a process of elongating the disc film such that elongation magnification power by elongation becomes 10-30 times.

Further, the third polymer layer 114-3 has at least one layer of a base layer including an ethylene-based copolymer whose density is 900 kg/m$^3$ or more and whose weight-average molecular weight Mw/number-average molecular weight Mn is 5-20 and at least one layer of a soft layer including a polymer material, where the ethylene-based copolymer is an ethylene homopolymer or an ethylene-α-olefin copolymer in which a content of an α-olefin unit with carbon numbers of 3-6 is less than 2 wt %, where a fusion point Tm2 of the polymer material is lower than a fusion point Tm1 of the ethylene-based copolymer, where a tensile modulus of the polymer material is 10-50 GPa, and where a return angle by a 180° bending test is 65° or less.

The first housing part 111 and the second housing part 112 included in the foldable housing 110 may be made of leather, artificial leather, a plastic material, a metal material, or a fiber material. For example, the first housing part 111 and the second housing part 112 may be formed with a polymer layer used as a material of the connection part 113. Further, the first housing part 111 and the second housing part 112 are not limited to the foregoing material and may be formed using various materials according to the development of technology.

Figure 2A:
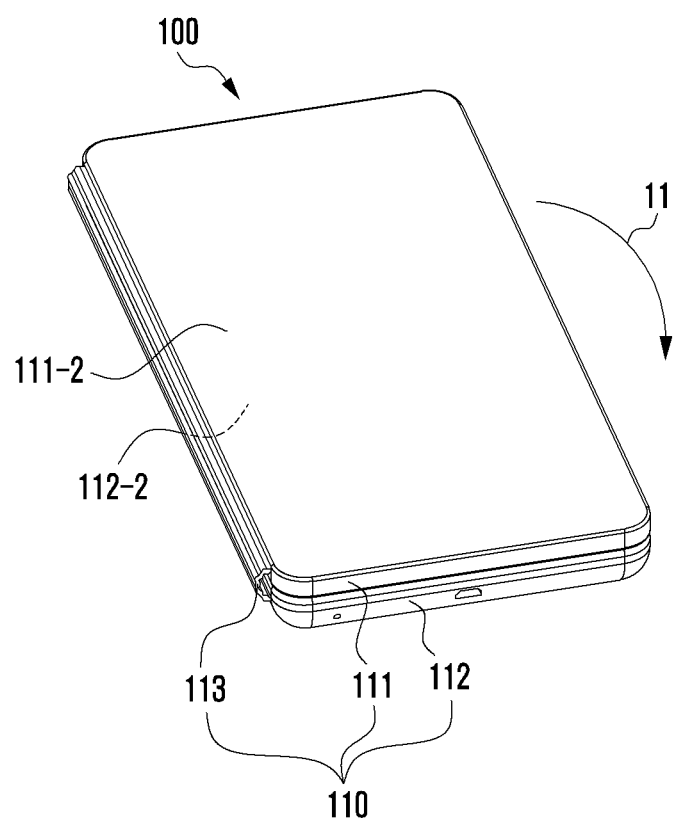
FIGS. 2A and 2B are perspective views of an electronic device that maintains at least one angle of a selected range according to an embodiment of the present disclosure.
Figure 2B:
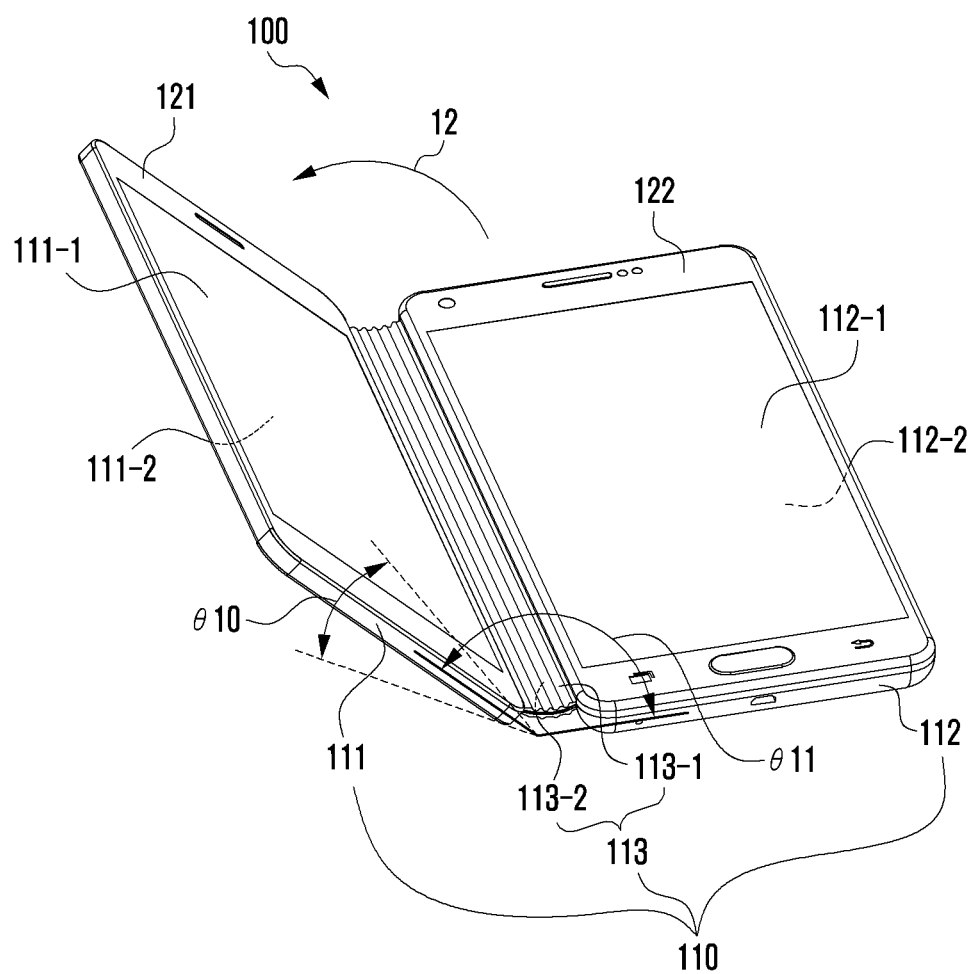

FIGS. 2A and 2B are perspective views of an electronic device 100 that maintains at least one of angles of a selected range according to an embodiment of the present disclosure.

Referring to FIG. 2A, in a state in which the foldable housing 110 is folded in a first direction 11, the first surface 111-1 of the first housing part 111 and the first surface 112-1 of the second housing part 112 may face each other. An attachment force may be applied between the first surface 111-1 of the first housing part 111 and the first surface 112-1 of the second housing part 112. For example, by attraction between one pole of a magnet mounted at one side of the first housing part 111 and the other pole of a magnet mounted at one side of the second housing part 112, the first surface 111-1 of the first housing part 111 and the first surface 112-1 of the second housing part 112 may maintain a contact state. Alternatively, by attachable fabric (e.g., Velcro®) disposed at one side of the first housing part 111 and at one side of the second housing part 112, the first surface 111-1 of the first housing part 111 and the second surface 112-1 of the second housing part 112 may maintain a contact state. Further, the first surface 111-1 of the first housing part 111 and the first surface 112-1 of the second housing part 112 may face each other by various fastening structures, which is in a range that may be implemented by a person of ordinary skill in the art and a detailed description thereof is omitted.

Further, in this case, the first direction 11 may be a direction in which the foldable housing 110 is folded. The first direction 11 may be, for example, a clock-wise direction in which the first housing part 111 rotates toward the second housing part 112 based on a folding shaft in which the foldable housing 110 is folded.

Referring to FIG. 2B, in a state in which the foldable housing 110 is folded in the first direction 11 in FIG. 2A, an external force may be applied that unfolds the foldable housing 110 in a second direction 12 in FIG. 2B, which is a direction opposite to the first direction 11 in FIG. 2A. For example, in a state in which a user holds the first housing part 111 by one hand, a user's external force may be applied that unfolds the second housing part 112 by the user's other hand in the second direction 12 in FIG. 2B.

For example, at one side of the first housing part 111, a first magnetic body may be provided; and at one side of the second housing part 112, a second magnetic body may be provided. Both the first magnetic body and the second magnetic body may be provided with a magnet having a polarity, or one may be formed with a magnet and the other one may be made of a metal material that may be magnetically attached to a magnet. In this case, a magnitude of a user's external force that unfolds the foldable housing 110 may be greater than a magnetic attraction force operating between the first magnetic body and the second magnetic body. In a state in which the first surface 111-1 of the first housing part 111 and the first surface 112-1 of the second housing part 112 face each other, an external force may be applied until the first surface 111-1 and the first surface 112-1 are separated or an external force may be applied until the first surface 111-1 of the first housing part 111 and the first surface 112-1 of the second housing part 112 are unfolded to angles of a selected range.

Accordingly, as shown in FIG. 2B, as the foldable housing 110 is unfolded in the second direction 12, an angle between the first surface 111-1 of the first housing part 111 and the first surface 112-1 of the second housing part 112 may maintain at least one angle θ11 of angles of a selected range. In this case, even in a state in which an external force for unfolding the housing 110 in the second direction 12 is not applied, the foldable housing 110 may maintain at least one angle θ11 of angles θ10 of a selected range. That is, as a tensile force applied to a first surface 113-1 of the connection part 113 and a compressive force applied to a second surface 113-2 of the connection part 113 are in equilibrium, the foldable housing 110 may maintain at least one angle θ11 of angles of a selected range.

The angle θ10 of a selected range may be determined if producing the foldable housing 110 or may be determined by a seller or a user of the foldable housing 110. For example, the angle θ10 of a selected range may be about 90° to about 180°. Alternatively, for another example, the angle θ10 of a selected range may be about 120° to about 150°. Alternatively, for another example, the angle θ10 of a selected range may be about 130° to about 140°. At least one angle θ11 may be determined within an angle θ10 of a selected range. At least one angle θ11 may be changed within the angle θ10 of a selected range according to the durability of a thermosetting polymer included in the polymer layer of the connection part 113, a production environment, a user's use environment, a use time, or a use form.

If the angle θ10 of a selected range is determined upon producing the foldable housing 110, in a state in which a thermosetting polymer is bent to one angle of the angle θ10 of a selected range, the angle θ10 of a selected range may be determined by a process of applying heat to a bent boundary area. That is, as a material property according to a molecular structure change of a bent boundary area of the thermosetting polymer is changed by a process of applying heat, a restoring force of the foldable housing 110 that maintains the angle θ10 of a selected range may be generated. In this case, a change of a material property may include, for example, reduction of about 30% of flexibility of the foldable housing 110 in a boundary area. In this case, a thickness of a thermosetting polymer determined in consideration of a restoring force and flexibility of the foldable housing 110 may be about 0.1 mm to 0.5 mm. A thermosetting polymer constituting each polymer layer may be a thermosetting polymer of a single layer or may be layered thermosetting polymers of several layers. A thickness of a single layer of a thermosetting polymer may be about 0.1 mm to 0.5 mm, and a thickness of a layered structure of thermosetting polymer may be about 0.1 mm to 0.5 mm. If a thickness of a layered structure of thermosetting polymer is about 0.1 mm, a thickness of an individual thermosetting polymer forming a layered structure may be less than 0.1 mm. A thickness of the thermosetting polymer may be a value between about 0.1 mm and about 0.3 mm and may be a value between about 0.3 mm and 0.5 mm.

As shown in FIG. 2B, if the foldable housing 110 maintains at least one angle θ11 of angles θ10 of a selected range, the at least one angle θ11 may be changed by an external force applied to the electronic device 100. For example, in a situation in which a user holds only the second housing part 112 and shakes the second housing part 112 with a predetermined strength, the at least one angle may be changed. Specifically, if a screen is displayed on the first display 121, in order to control contents of the displayed screen, a user may perform a user input through the second display 122. In this case, if an external force is strong according to a user input, at least one holding angle θ11 may be changed significantly. Therefore, even if a strong external force is applied, a separate member for enabling the foldable housing 110 to continuously maintain a predetermined angle may be required.

Hereinafter, various embodiments of the foldable housing 110 including a fixing member for maintaining a predetermined angle are described.

The fixing member for maintaining a predetermined angle may include, for example, a ring type fixing member disposed at the connection part 113 in a ring form, a rotation type fixing member disposed at the connection part 113 while rotating, and an automatic fixing member automatically disposed at the connection part 113 if the foldable housing 110 is unfolded. However, the fixing member for maintaining a predetermined angle is not limited to the foregoing examples but may have various forms that may be implemented by a person of ordinary skill in the art.

Figure 3A:
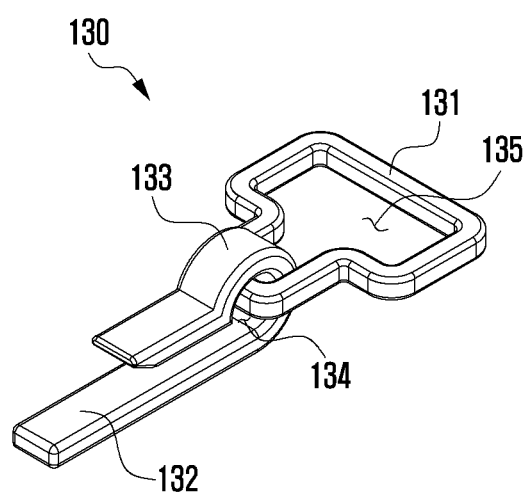
FIGS. 3A and 3B are perspective views of a ring type fixing member according to an embodiment of the present disclosure.
Figure 3B:
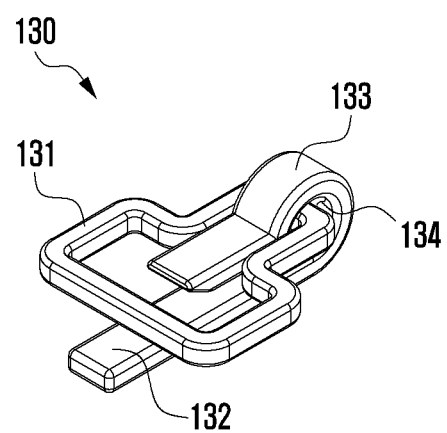

FIGS. 3A and 3B are perspective views of a ring type fixing member according to an embodiment of the present disclosure.

Referring to FIGS. 3A and 3B, a ring type fixing member 130 may include a clip portion 132 disposed at the connection part 113 of the foldable housing 110 and a ring portion 131 inserted between one side of the first housing part 111 and one side of the second housing part 112 by rotating at one side of the clip portion 132 such that the first surface 111-1 of the first housing part 111 and the first surface 112-1 of the second housing part 112 maintain a predetermined angle. Further, the ring type fixing member 130 may be formed with a clip portion 132 disposed at the connection part 113 of the foldable housing 110 and a ring portion 131 that provides a state in which the foldable housing 110 maintains a predetermined angle by rotating within a hole 134 as a shaft formed along a protrusion 133 included in the clip portion 132.

As shown in FIGS. 3A and 3B, the ring portion 131 inserted into the hole 134 of the clip portion 132 is rotatably connected to the clip portion 132, but this is merely an example. In another example, a rotation shaft member is included between the clip portion 132 and the ring portion 131; thus, the clip portion 132 and the ring portion 131 may be connected to rotate about the rotation shaft member. In another example, the clip portion 132 and the ring portion 131 may be connected by a flexible member of a string or chain form. According to an embodiment of the present disclosure, the ring type fixing member 130 is not limited to being deposed to the connection part 113 of the foldable housing 110, and at least a portion of the ring type fixing member 130 may be fixed to or may be included in a predetermined space of the first housing part 111 and/or the second housing part 112 of the foldable housing 110.

FIG. 3A illustrates a first state in which the ring portion 131 included in the ring type fixing member 130 is unfolded by rotating within the hole 134 as a shaft of the clip portion 132 by 180°, and FIG. 3B illustrates a second state in which the ring portion 131 included in the ring type fixing member 130 is folded to face the clip portion 132. If the ring type fixing member 130 is disposed in the foldable housing 110 in the second state, the first surface 111-1 of the first housing part 111 and the first surface 112-1 of the second housing part 112 of the foldable housing 110 may maintain a predetermined angle.

FIGS. 4A to 8 are perspective views, diagrams, and partial views of an electronic device 100 in which a ring type fixing member 130 is disposed according to an embodiment of the present disclosure.

The ring type fixing member 130 may be detachably disposed in at least a portion of the connection part 113 and may be fixed to the connection part 113 such that the ring type fixing member 130 cannot be detached from the connection part 113.

Figure 4A:
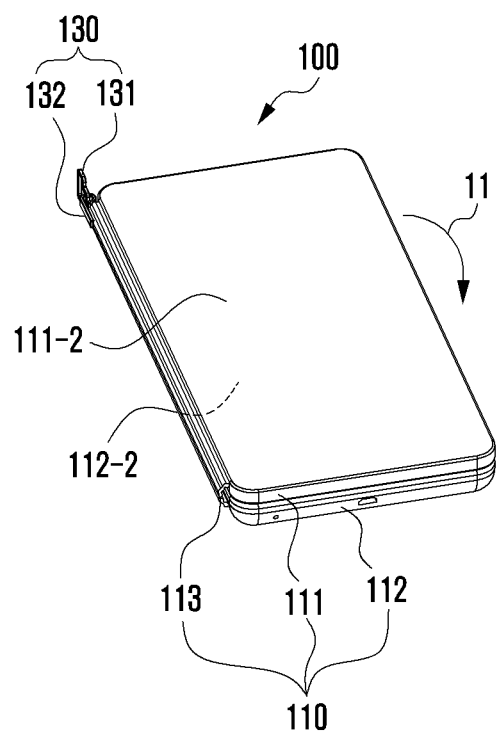
FIGS. 4A to 8 are perspective views, diagrams, and partial views of an electronic device in which a ring type fixing member is disposed according to an embodiment of the present disclosure.
Figure 4B:
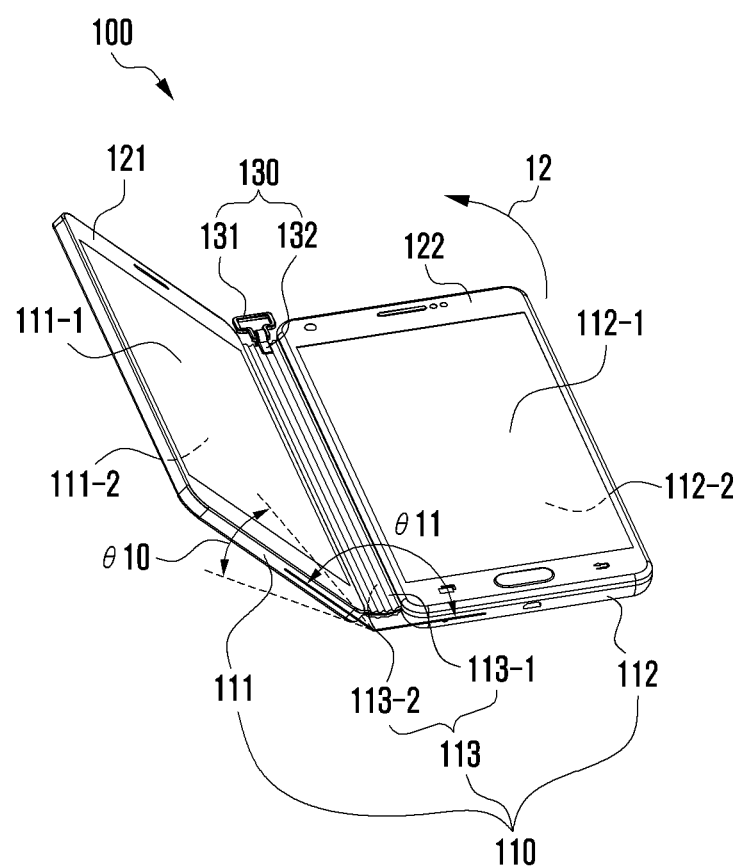
Figure 4C:
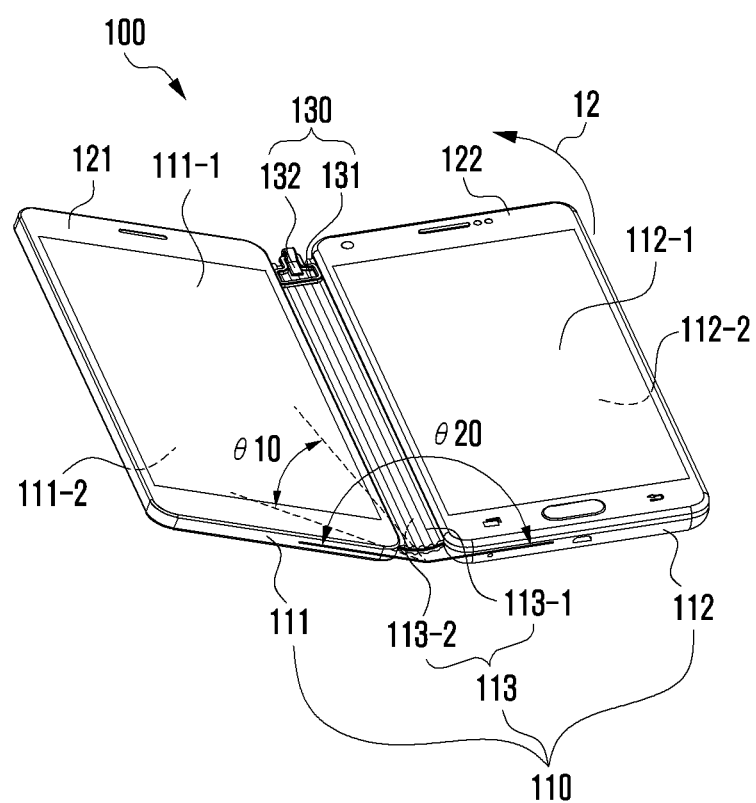

Referring to FIGS. 4A to 4C, the ring type fixing member 130 is disposed at one side of the connection part 113, but this is merely an example and the ring portion 131 of the ring type fixing member 130 is connected to the clip portion 132 by a strip or a chain and may be disposed at one point (e.g., the center of the connection part 113) on the connection part 113 according to an object of a production company or a user.

FIG. 4A illustrates a state in which the first surface 111-1 of the first housing part 111 and the first surface 112-1 of the second housing part 112 face each other if the foldable housing 110 is folded in the first direction 11. In this case, in order for the foldable housing 110 to be folded by close contact, in a state in which the clip portion 132 of the ring type fixing member 130 is mounted in the connection part 113, the ring portion 131 of the ring type fixing member 130 may protrude from the foldable housing 110. If FIG. 4A is viewed from another angle, the diagrams of FIGS. 5A and 5B may result.

Figure 5A:
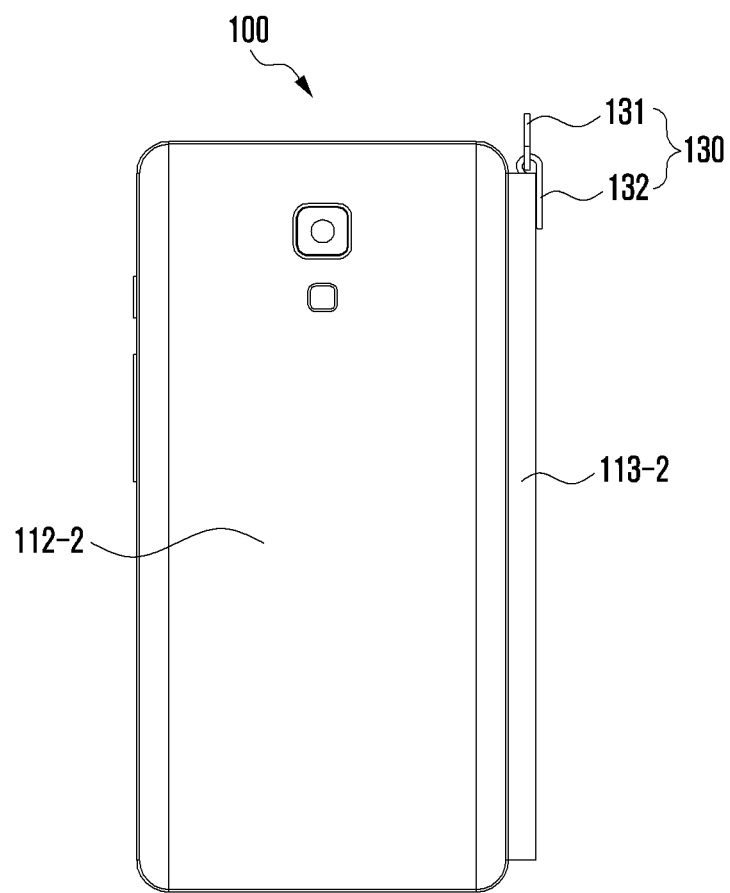

Referring to FIG. 5A, a bottom view of the electronic device 100 is shown in a folded state of the foldable housing 110 in which the ring type fixing member 130 is disposed.

Figure 5B:
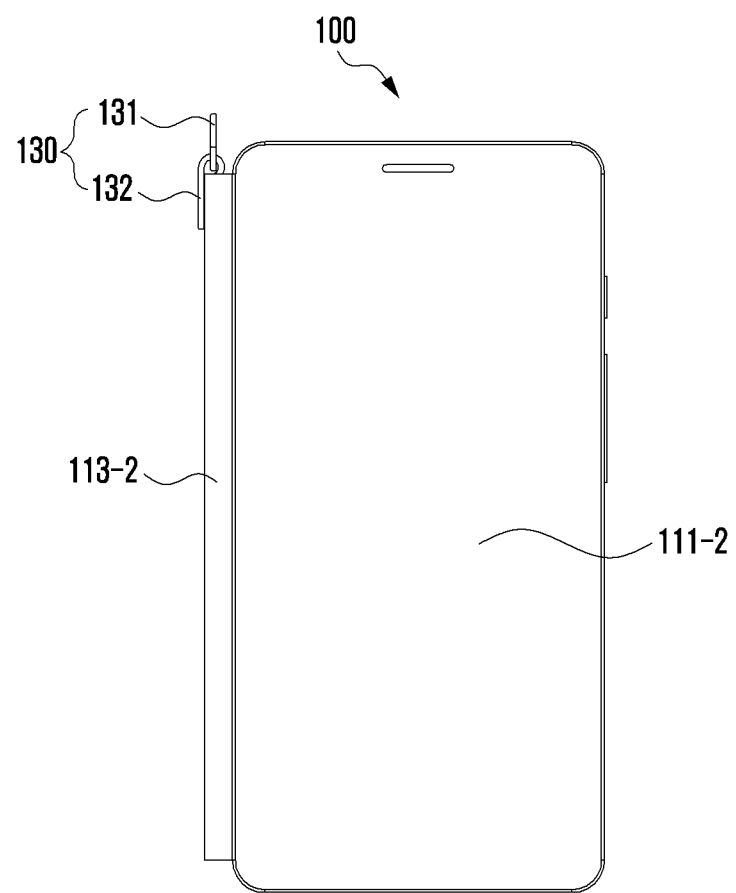

Referring to FIG. 5B, a top plan view of the electronic device 100 is shown in a folded state of the foldable housing 110 in which the ring type fixing member 130 is disposed. In FIGS. 5A and 5B, the clip portion 132 of the fixing member 130 may be mounted in a form fitted into one side of the connection part 113.

In FIG. 4A, in a state in which the foldable housing 110 is folded in a first direction, a user may apply an external force that may unfold the foldable housing 110 in the second direction 12.

Accordingly, as shown in FIG. 4B, if the foldable housing 110 is unfolded in the second direction 12, an angle between the first surface 111-1 of the first housing part 111 and the first surface 112-1 of the second housing part 112 may maintain at least one angle θ11 of angles θ10 of a selected range. In this case, in a state in which the clip portion 132 of the ring type fixing member 130 is mounted to one side of the connection part 113, the ring portion 131 of the ring type fixing member 130 may be located externally to the connection part 113.

As shown in FIG. 4B, in a state in which an external force to the foldable housing 110 is removed, the foldable housing 110 may maintain at least one angle θ11 of angles θ10 of a selected range. The at least one angle θ11 may be at least one angle of angles of a selected range of a thermosetting polymer described above with reference to FIGS. 2A and 2B. If FIG. 4B is viewed in another angle, the view illustrated in FIG. 6 may result.

Figure 6A:
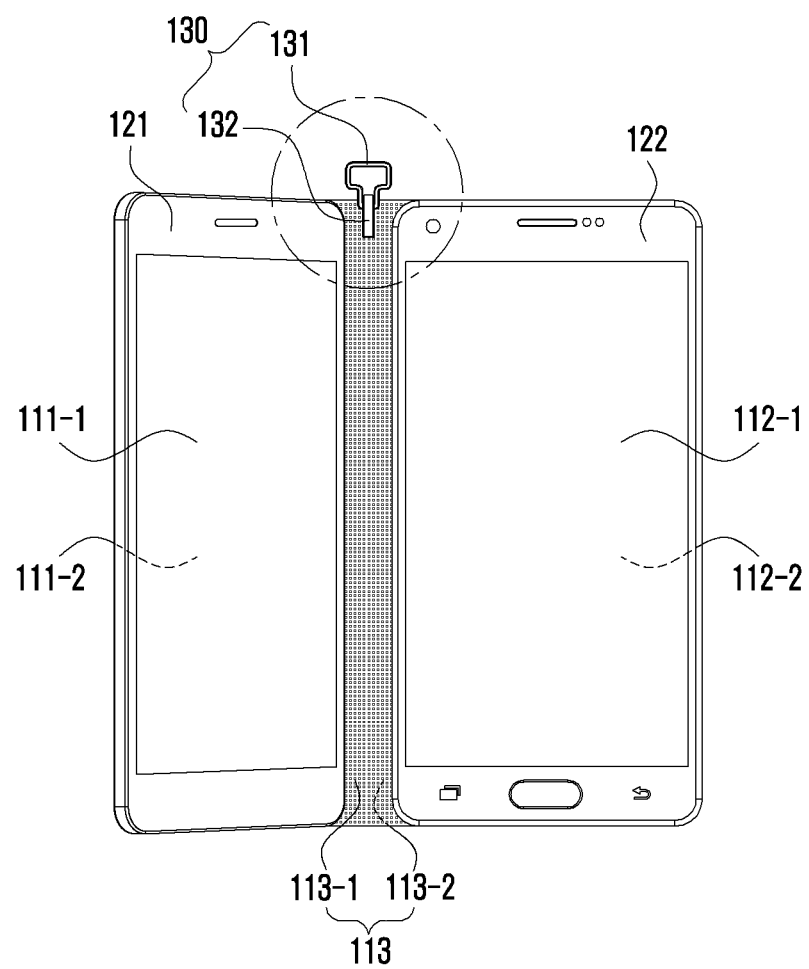

Referring to FIG. 6A, a top plan view of the electronic device 100 is shown in a state in which the foldable housing 110, in which the ring type fixing member 130 is disposed, is unfolded in the second direction 12. As shown in FIG. 6A, at the center of one side of the connection part 113, the clip portion 132 of the ring type fixing member 130 may be mounted in a fitting form.

Figure 6B:
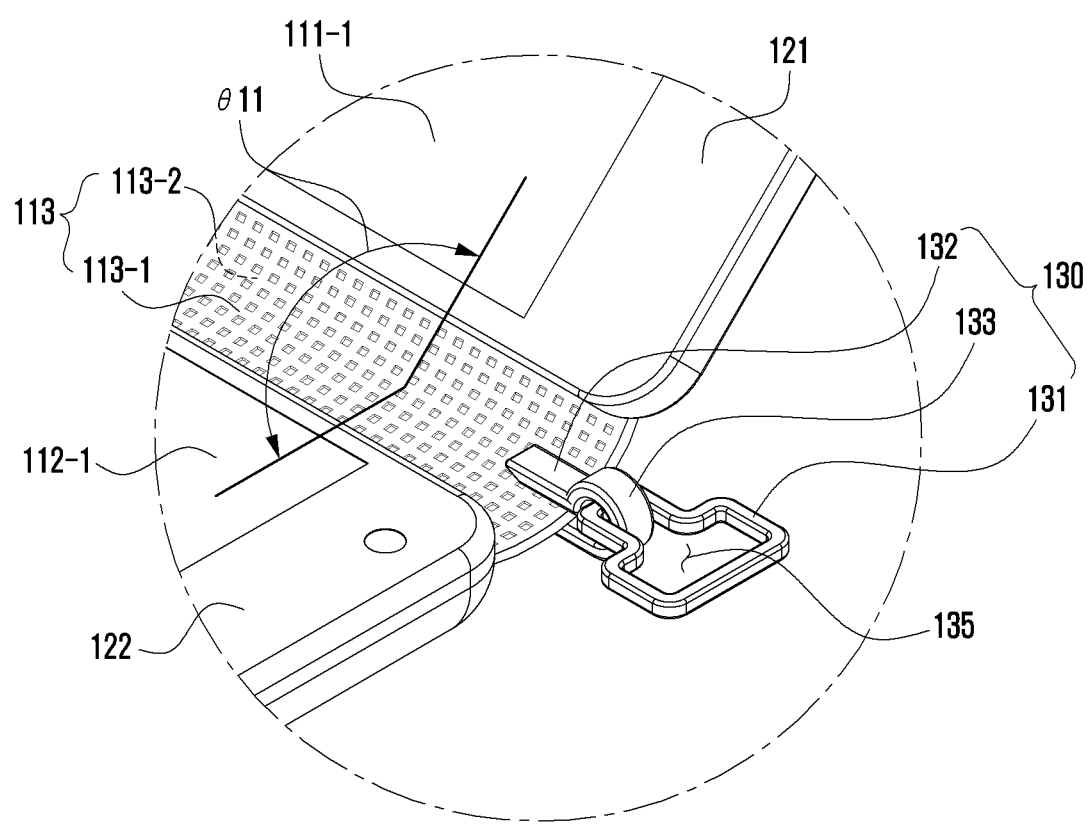

Referring to FIG. 6B, an enlarged perspective partial view of an area including the ring type fixing member 130 in FIG. 6A is shown.

As shown in FIG. 6B, the protrusion 133 of the ring type fixing member 130 may protrude in the same direction as that in which the first surface 111-1 of the first housing part 111 and the second surface 112-1 of the second housing part 112 face. Therefore, the ring portion 131 of the ring type fixing member 130 may be completely folded in a direction toward the center of the connection part 113 using the hole 134 as a shaft formed along the protrusion 133 of the clip portion 132.

In a state in which the foldable housing 110 is unfolded in the second direction 12 so as to maintain at least one angle θ11 of angles θ10 of a selected range, if an external force is additionally applied to only one of the first housing part 111 and the second housing part 112, at least one angle θ11 may be changed. That is, the foldable housing 110 may be shaken by an external force. Therefore, as shown in FIG. 4B, if the foldable housing 110 is unfolded in the second direction 12 so as to maintain at least one angle θ11, in order to securely fix the foldable housing 110, a user may use the ring type fixing member 130.

Accordingly, as shown in FIG. 4C, if the foldable housing 110 is unfolded in the second direction 12 by the ring type fixing member 130, an angle between the first surface 111-1 of the first housing part 111 and the first surface 112-1 of the second housing part 112 may maintain a predetermined angle θ20. For example, in order to maintain an angle between the first surface 111-1 of the first housing part 111 and the first surface 112-1 of the second housing part 112 in a predetermined angle θ20, a user may rotate the ring portion 131 of the ring type fixing member 130 in a central direction of the connection part 113 using the hole 134 as a shaft of the clip portion 132 to dispose the ring portion 131 of the ring type fixing member 130 between one side of the first surface 111-1 of the first housing part 111 and one side of the first surface 112-1 of the second housing part 112.

In this case, a user may increase an angle between the first surface 111-1 of the first housing part 111 and the first surface 112-1 of the second housing part 112 to be greater than at least one angle θ11 and insert the ring portion 131 into a secured area between the first surface 111-1 of the first housing part 111 and the first surface 112-1 of the second housing part 112. Alternatively, if a user applies an external force to the ring portion 131, while the first surface 111-1 of the first housing part 111 and the first surface 112-1 of the second housing part 112 are unfolded to be greater than at least one angle θ11 by a pushing force of the ring portion 131, the ring portion 131 may be inserted into a secured area between the first surface 111-1 of the first housing part 111 and the first surface 112-1 of the second housing part 112.

If the first surface 111-1 of the first housing part 111 and the first surface 112-1 of the second housing part 112 are unfolded to a predetermined angle θ20 greater than at least one angle θ11, a restoring force for restoring to an angle θ10 of a selected range may be applied to the connection part 113. One side of the first housing part 111 and one side of the second housing part 112 may come in close contact with both end portions of a width of the ring portion 131 by a restoring force. A characteristic of a restoring force corresponds to a characteristic of a thermosetting polymer described above with reference to FIGS. 1A and 1B; therefore, a detailed description thereof is omitted.

Specifically, if the angle θ10 of a selected range is about 120° to about 150°, there is an equilibrium between the second surface 113-2 of the connection part 113 that maintains the angle θ10 of a selected range by a restoring force and the first surface 113-1 of the connection part 113 to which a support force that pushes one side of the first housing part 111 and one side of the second housing part 112 is applied by the ring portion 131; thus, an angle between the first surface 111-1 of the first housing part 111 and the second surface 112-1 of the second housing part 112 may be maintained, for example at about 160°, which is a predetermined angle θ20 greater than the angle θ10 of a selected range. In this case, because a support force and a restoring force maintain an equilibrium state, even if an external force is applied to the foldable housing 110, an angle between the first surface 111-1 of the first housing part 111 and the first surface 112-1 of the second housing part 112 may maintain a predetermined angle θ20 without shaking. A view of FIG. 4C from another angle is shown in FIGS. 7A and 7B.

Figure 7A:
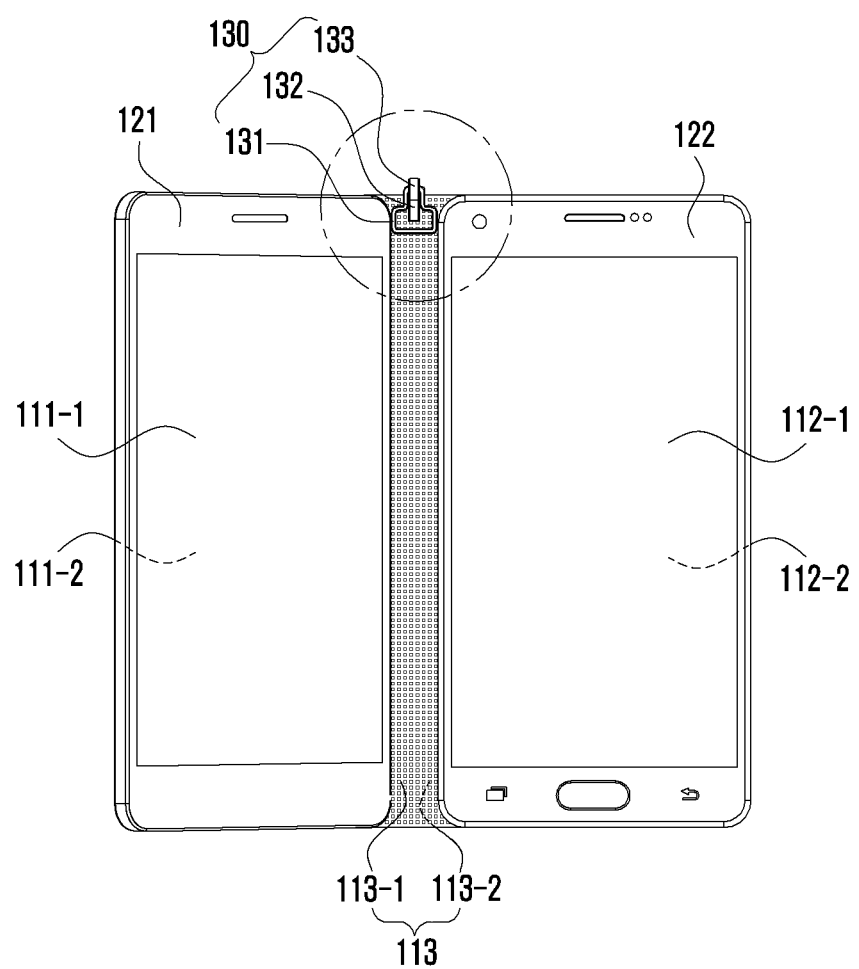

Referring to FIG. 7A, a top plan view of the electronic device 100 is shown in a state in which the foldable housing 110, in which the ring type fixing member 130 is disposed, maintains a predetermined angle. As shown in FIG. 7A, the ring portion 131 of the ring type fixing member 130 may be inserted between one side of the first housing part 111 and one side of the second housing part 112 in a direction toward the center of the connection part 113.

Figure 7B:
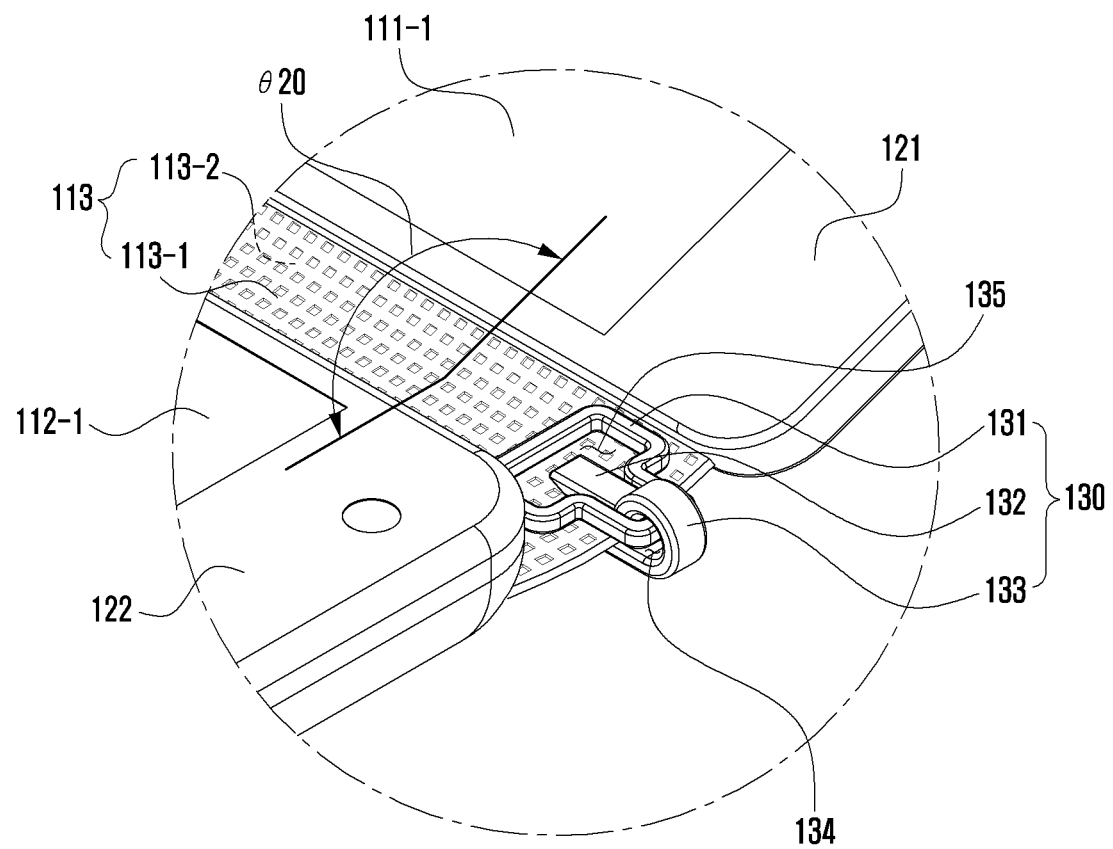

Referring to FIG. 7B, an enlarged perspective partial view of an area including the ring type fixing member 130 is shown.

As shown in FIG. 7B, a width of the ring portion 131 may be less than that of a width of the first surface 113-1 of the connection part 113 facing in the same direction as that of the first surface 111-1 of the first housing part 111 and the first surface 112-1 of the second housing part 112. Accordingly, the ring type fixing member 130 may be inserted between one side of the first housing part 111 and one side of the second housing part 112.

Further, a hole 135 formed by the ring portion 131 located at the first surface 131-1 of the connection part 113 may have a size including the clip portion 132 located at the first surface 131-1 of the connection part 113 therein. That is, if the ring type fixing member 130 is inserted, the hole 135 formed by the ring portion 131 may be greater than a size of the clip portion 132 disposed at the first surface 113-1 of the connection part 113 such that the ring type fixing member 130 completely contacts with the connection part 113.

Further, a predetermined angle θ20 maintained by the first surface 111-1 of the first housing part 111 and the first surface 112-1 of the second housing part 112 may be determined according to a width of the ring portion 131. For example, as the width of the ring portion 131 increases, a predetermined angle θ20 maintained by the first surface 111-1 of the first housing part 111 and the first surface 112-1 of the second housing part 112 increases, and as the width of the ring portion 131 decreases, a predetermined angle θ20 maintained by the first surface 111-1 of the first housing part 111 and the first surface 112-1 of the second housing part 112 decreases.

As shown in FIGS. 4A to 4C, in a state in which an external force is not applied to the foldable housing 110, the ring type fixing member 130 may be disposed at the connection part 113 in a first state or a second state.

For example, as shown in FIG. 4B, if the ring type fixing member 130 is in a first state, the clip portion 132 may be mounted at one side of the connection part 113, and the ring portion 131 may be located externally of the connection part 113. If the ring type fixing member 130 is in a first state, an angle between the first surface 111-1 of the first housing part 111 and the first surface 112-1 of the second housing part 112 may maintain a first angle, which is at least one angle θ11 of angles θ10 of a selected range. In this case, if the connection part 113 includes the first surface 113-1 to which a tensile force is applied and the second surface 113-2 to which a compressive force is applied, the tensile force applied to the first surface 113-1 and the compressive force applied to the second surface 113-2 may be in equilibrium.

For example, as shown in FIG. 4C, if the ring type fixing member 130 is in a second state, the clip portion 132 may be mounted at one side of the connection part 113, and the ring portion 131 may be inserted between the first surface 111-1 of the first housing part 111 and the first surface 112-1 of the second housing part 112. If the ring type fixing member 130 is in a second state, an angle between the first surface 111-1 of the first housing part 111 and the first surface 112-1 of the second housing part 112 may maintain a second angle, which is a predetermined angle θ20. The second angle θ20 if the ring type fixing member 130 is in a second state may be greater than the first angle θ11 if the ring type fixing member 130 is in a first state. In this case, if the connection part 113 includes the first surface 113-1 to which a support force is applied and the second surface 113-2 to which a restoring force is applied, the support force applied to the first surface 113-1 and the restoring force applied to the second surface 113-2 may be in equilibrium.

According to an embodiment of the present disclosure, the connection part 113 may have at least one ring type fixing member 130. In at least one ring type fixing member 130, a width of the ring portion 131 may be different.

Figure 8:
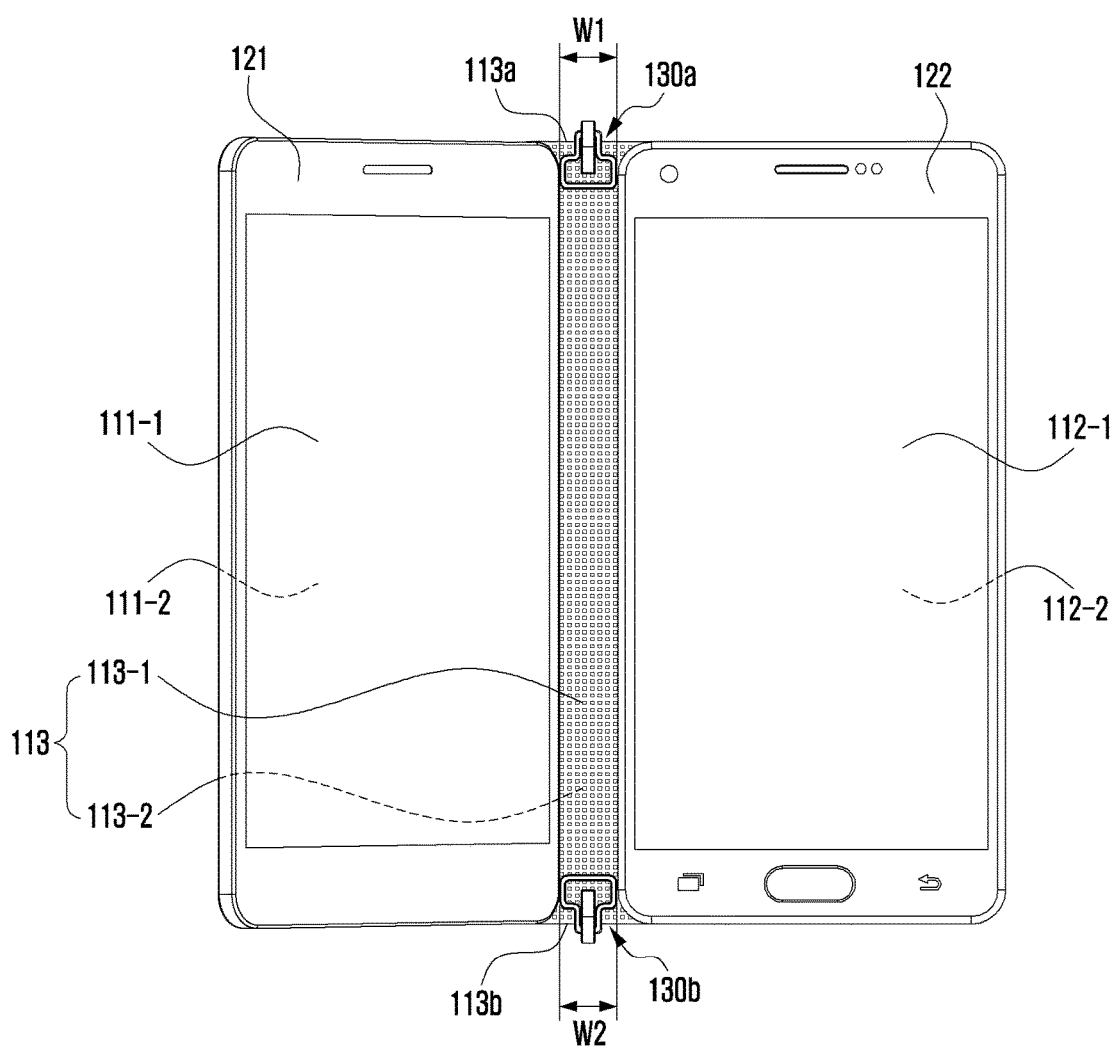

Referring to FIG. 8, according to an embodiment of the present disclosure, two ring type fixing members 130a and 130b having different widths may be disposed at an upper end portion 113a and a lower end portion 113b, respectively, of the connection part 113. A width of a ring portion 131a of the first ring type fixing member 130a disposed at an upper end portion 113a of the connection part 113 may be W1, and a width of the second ring type fixing member 130b disposed at a lower end portion 113b of the connection part 113 may be W2. The width W1 of the ring portion 131a of the first ring type fixing member 130a may be greater than or less than a width W2 of a ring portion 131b of the second ring type fixing member 130b.

The first ring type fixing member 130a in which a width of the ring portion 131a is W1 may enable maintenance of an unfolded state in an angle θ30, and the second ring type fixing member 130b in which a width of the ring portion 131b is W2 may enable maintenance of an unfolded state in an angle θ31.

In an embodiment of the present disclosure, at least three ring type fixing members may be disposed.

Figure 9:
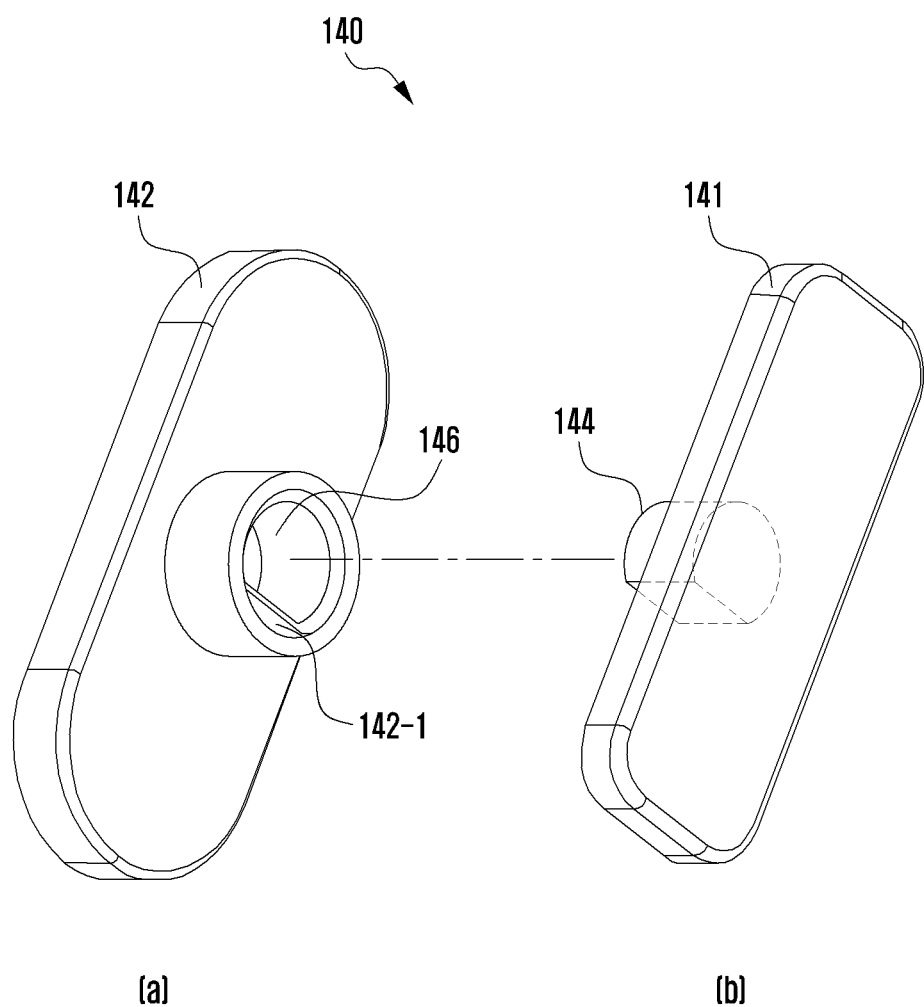
FIG. 9 is a perspective view a rotation type fixing member according to an embodiment of the present disclosure.

FIG. 9 is a perspective view of a rotation type fixing member 140 according to an embodiment of the present disclosure.

Referring to FIG. 9, a rotation type fixing member 140 may include a rotation portion 141 disposed at the first surface 113-1 of the connection part 113 of the foldable housing 110 and a fastening portion 142 disposed at the second surface 113-2 of the connection part 113 so as to fix the rotation portion 141 to the connection part 113. At one of the rotation portion 141 and the fastening portion 142, a protruding portion 144 for coupling members may be formed, and at the other one thereof, a recess 146 for coupling to the protruding portion 144 may be formed. In this case, the recess 146 may be curvedly formed from a plane internally and may be formed within a protruded portion 144.

For example, if the rotation portion 141 includes a protruding portion 144 and if a recess 146 is formed within the protruded portion 144 of the fastening portion 142, the rotation portion 141 and the fastening portion 142 may be fastened in a fitting structure without a joint with the connection part 113 interposed therebetween or may be fastened with the connection part 113 interposed therebetween such that a protrusion (e.g., a protrusion of a helix shape) formed along an outer circumferential surface of a protruding portion 144 engages along a recess 146 (e.g., a recess of a helix shape) formed along an inner circumferential surface of a depressed portion. Further, if the rotation portion 141 and the fastening portion 142 are fastened, at a recess 146 of the fastening portion 142, a jaw 142-1 for preventing the rotation portion 141 and the fastening portion 142 from rotating in a different direction may exist. In an embodiment of the present disclosure, the rotation portion 141 may include a depressed portion, and the fastening portion 142 may include a rotation portion.

FIGS. 10A to 15 are perspective views, diagrams, and partial views of an electronic device 100 in which a rotation type fixing member 140 is disposed according to an embodiment of the present disclosure.

The rotation type fixing member 140 may be detachably disposed in at least a portion of the connection part 113 and may be fixed to the connection part 113 such that the rotation type fixing member 140 cannot to be detached from the connection part 113.

Figure 10A:
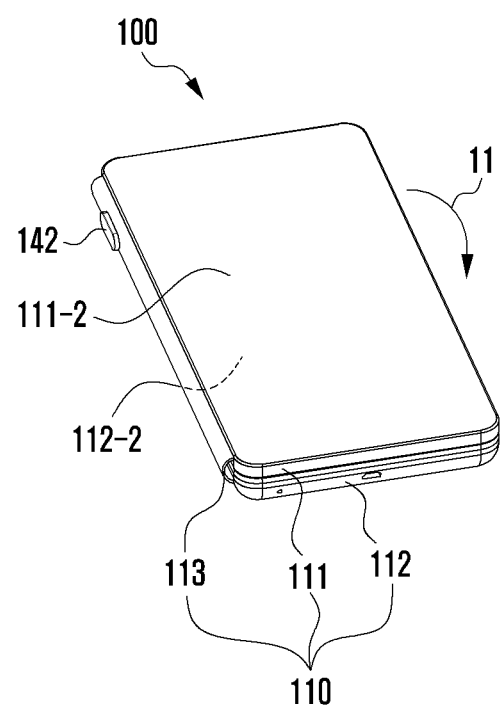
FIGS. 10A to 15 are perspective views, diagrams, and partial views of an electronic device in which a rotation type fixing member is disposed according to an embodiment of the present disclosure.
Figure 10B:
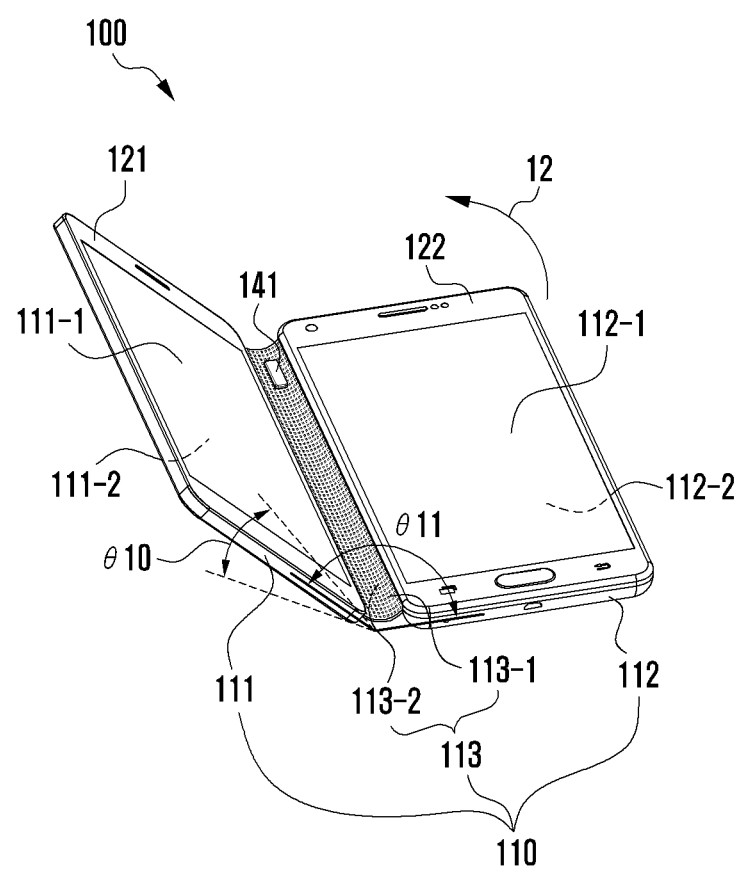
Figure 10C:
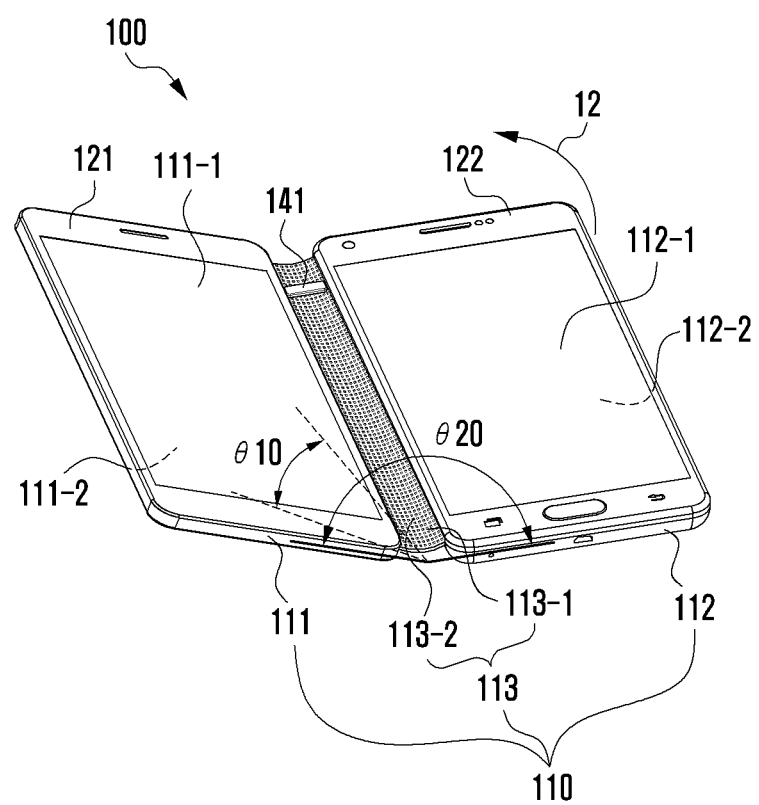

Referring to FIGS. 10A to 10C, the rotation type fixing member 140 is disposed at one side of the connection part 113. As shown in FIGS. 10A to 10C, a location of the rotation type fixing member 140 is merely an example, and the rotation type fixing member 140 may be disposed at a periphery of the center of the connection part 113 and may be disposed at a point on the connection part 113 according to an object of a production company or a user.

FIG. 10A illustrates a state in which the first surface 111-1 of the first housing part 111 and the first surface 112-1 of the second housing part 112 face each other if the foldable housing 110 is folded in the first direction 11. If FIG. 10A is viewed from another angle, the view illustrated in FIG. 11 results.

Figure 11A:
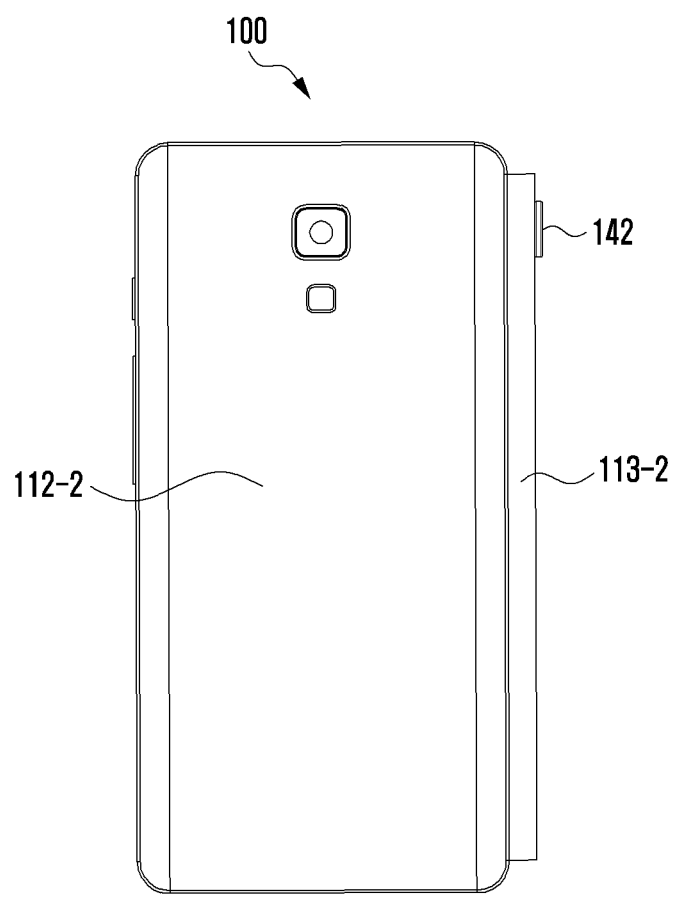

Referring to FIG. 11A, a bottom view of the electronic device 100 is shown in a folded state of the foldable housing 110 in which the rotation type fixing member 140 is disposed.

Figure 11B:
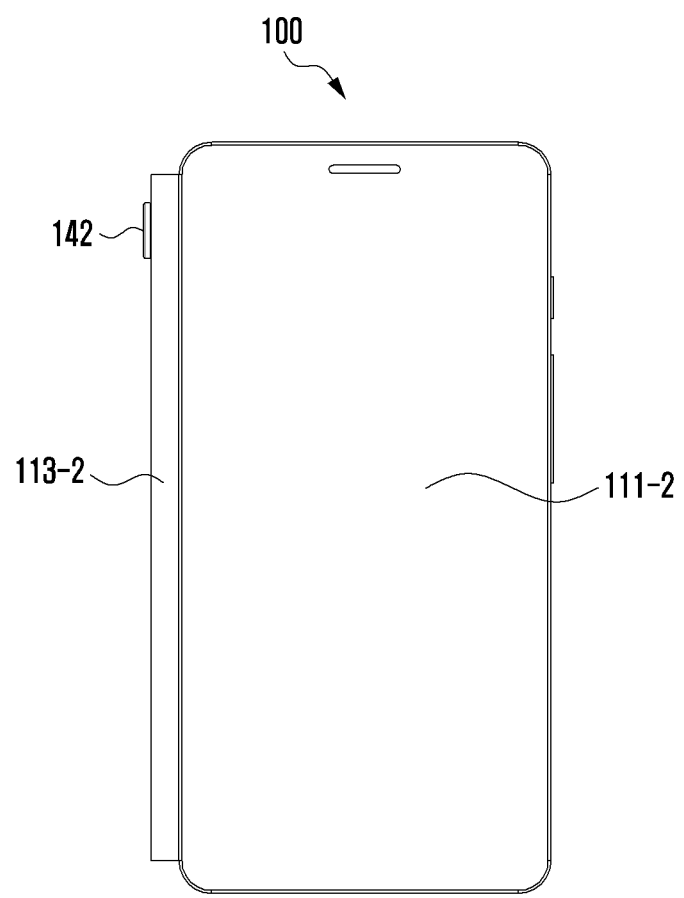

Referring to FIG. 11B, a top plan view of the electronic device 100 is shown in a folded state of the foldable housing 110 in which the rotation type fixing member 140 is disposed.

In FIGS. 11A and 11B, at the second surface 113-2 of the connection part 113, the fastening portion 142 of the rotation type fixing member 140 may be mounted to fix the rotation portion 141 disposed at the first surface 113-1 of the connection part 113. In this case, a point of the connection part 113 corresponding to the rotation type ring member 140 is punched; thus, the point may provide a space for fastening a protruding portion 144 of the rotation portion 141 of the rotation type fixing member 140 and a recess 146 of the fastening portion 142.

In FIG. 10A, in a state in which the foldable housing 110 is folded in the first direction 11, an external force that unfolds the foldable housing 110 in the second direction 12 may be applied.

Accordingly, as shown in FIG. 10B, if the foldable housing 110 is unfolded in the second direction 12, an angle between the first surface 111-1 of the first housing part 111 and the first surface 112-1 of the second housing part 112 may maintain at least one angle $\theta 11$ of angles $\theta 10$ of a selected range. In this case, a width of the rotation portion 141 of the rotation type fixing member 140 may be located at the first surface 113-1 of the connection part 113 to be parallel or almost parallel to one side of the first housing part 111 and one side of the second housing part 112.

In FIG. 10B, in a state in which an external force to the foldable housing 110 is removed, the foldable housing 110 may maintain at least one angle $\theta 11$ of angles $\theta 10$ of a selected range. The at least one angle $\theta 11$ may be at least one angle of a selected range of a thermosetting polymer described above with reference to FIG. 2. If FIG. 11B is viewed from another angle, the view in FIG. 12A results.

Figure 12A:
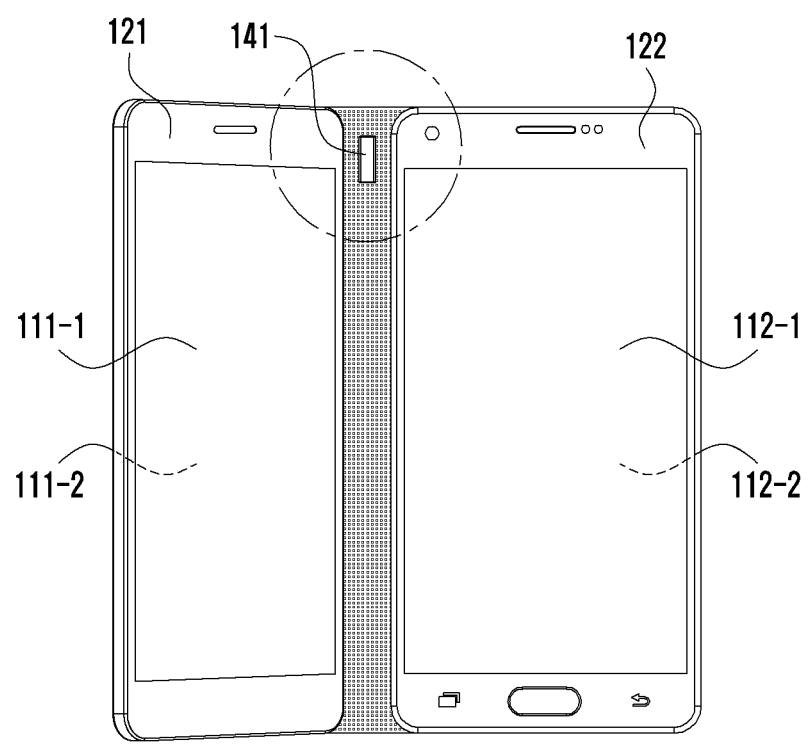

Referring to FIG. 12A, a top plan view of the electronic device 100 is shown in a state in which the foldable housing 110, in which the rotation type fixing member 140 is disposed, is unfolded in the second direction 12. As shown in FIG. 12A, at the center of one side of the connection part 113, the rotation portion 141 of the rotation type fixing member 140 may be disposed.

Figure 12B:
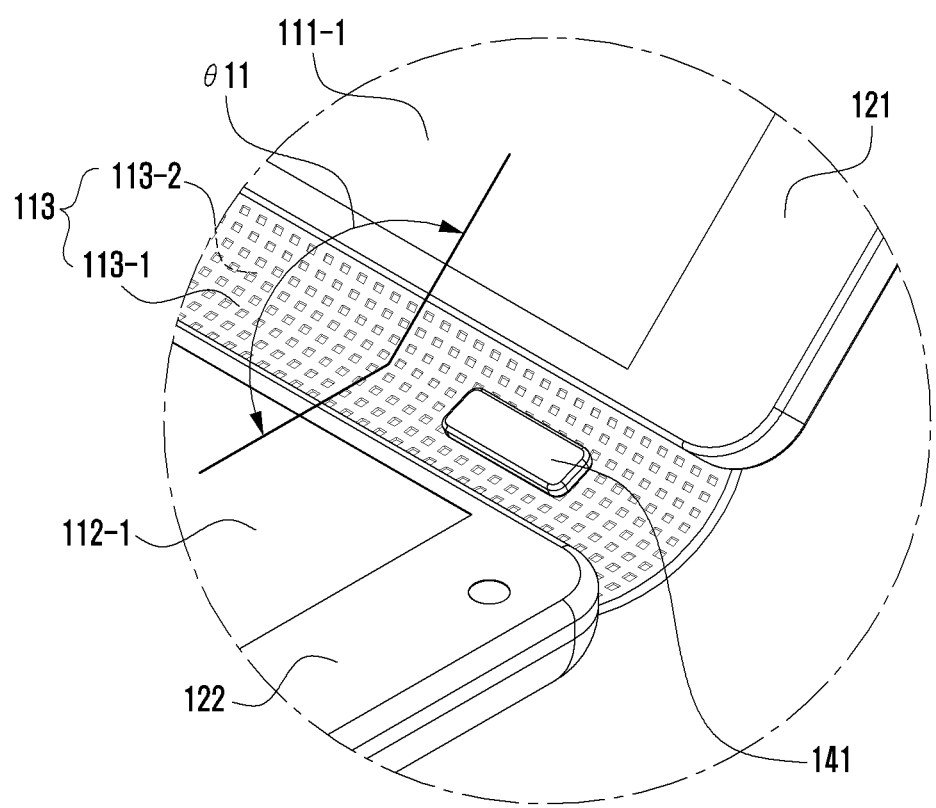

Referring to FIG. 12B, an enlarged perspective partial view of an area including the rotation portion 141 of the fixing member 140 in FIG. 12A is shown.

If the foldable housing 110 is unfolded in the second direction 12 so as to maintain at least one angle of a selected range, if an external force is applied only to one of the first housing part 111 and the second housing part 112, at least one angle $\theta 11$ may be changed. That is, the foldable housing 110 may be shaken by an external force. Therefore, as shown in FIG. 10B, if the foldable housing 110 is unfolded in the second direction 12 so as to maintain at least one angle $\theta 11$, in order to securely fix the foldable housing 110, a user may use the rotation type fixing member 140.

Accordingly, as shown in FIG. 10C, if the foldable housing 110 is unfolded in the second direction 12 by the rotation type fixing member 140, an angle between the first surface 111-1 of the first housing part 111 and the first surface 112-1 of the second housing part 112 may maintain a predetermined angle $\theta 20$. For example, a user may increase an angle between the first surface 111-1 of the first housing part 111 and the first surface 112-1 of the second housing part 112 to be greater than at least one angle $\theta 11$ such that an angle between the first surface 111-1 of the first housing part 111 and the second surface 112-2 of the second housing part 112 maintains a predetermined angle $\theta 20$, and a user may rotate the rotation portion 141 such that a width of the rotation portion 141 of the rotation type fixing member 140 is disposed vertically or almost vertically to one side of the first housing part 111 and one side of the second housing part 112 in a secured area between the first surface 111-1 of the first housing part 111 and the second surface 112-2 of the second housing part 112. Alternatively, if a user applies an external force to the rotation portion 141, while the first surface 111-1 of the first housing part 111 and the first surface 111-1 of the second housing part 112 are unfolded further than at least one angle $\theta 11$ by a pushing force of the rotation portion 141, the rotation portion 141 may be inserted into a secured area between the first surface 111-1 of the first housing part 111 and the second surface 112-2 of the second housing part 112.

If the first surface 111-1 of the first housing part 111 and the first surface 112-1 of the second housing part 112 are unfolded in a predetermined angle greater than the angles of the selected range, a restoring force for restoring to the at least one angle may be applied to the connection part 113. One side of the first housing part 111 and one side of the second housing part 112 may contact both end portions of a width of the rotation portion 141 by a restoring force. In an embodiment of the present disclosure, in the first housing part 111 and the second housing part 112, in a portion in which both end portions of a width of the rotation portion 141 contact, a recess may be formed. That is, at each of one side of the first housing part 111 and one side of the second housing part 112 corresponding to both end portions of a width of the rotation portion 141, a recess of a form fitting to both end portions of a width of the rotation portion 141 may be formed, and if a recess is formed in this way, in a state in which both end portions of a width of the rotation portion 141 are fitted to the recess, both end portions contact the first and second housing parts; thus, both end portions may more stably maintain a fixed state.

In an embodiment of the present disclosure, in the first housing part 111 and the second housing part 112, in order to stably maintain a fixed state in a state illustrated in FIG. 10C, the rotation type fixing member 140 may further include a separate fixing member. For example, at one side of the first housing part 111 and one side of the second housing part 112 that contacts both end portions of a width of the rotation portion 141 of the rotation type fixing member 140, a separate fixing member for fixing a location of the rotation portion 141 may be formed. Further, a forming location of a separate fixing member for fixing a location of the rotation portion 141 is not limited thereto but may be formed at any location of the first housing part 111 and the second housing part 112.

If an angle θ10 of a selected range is about 120° to about 150°, there is an equilibrium between a second surface of the connection part 113 that maintains the angle θ10 of a selected range by a restoring force and a first surface of the connection part 113 to which a support force that pushes one side of the first housing part 111 and one side of the second housing part 112 is applied by the rotation portion 141; thus, an angle between the first surface 111-1 of the first housing part 111 and the second surface 112-1 of the second housing part 112 may be maintained constantly, for example at about 160°, which is a predetermined angle θ20 greater than the angle θ10 of a selected range. FIGS. 13A to 14B show the view in FIG. 10C from another angle.

Figure 13A:
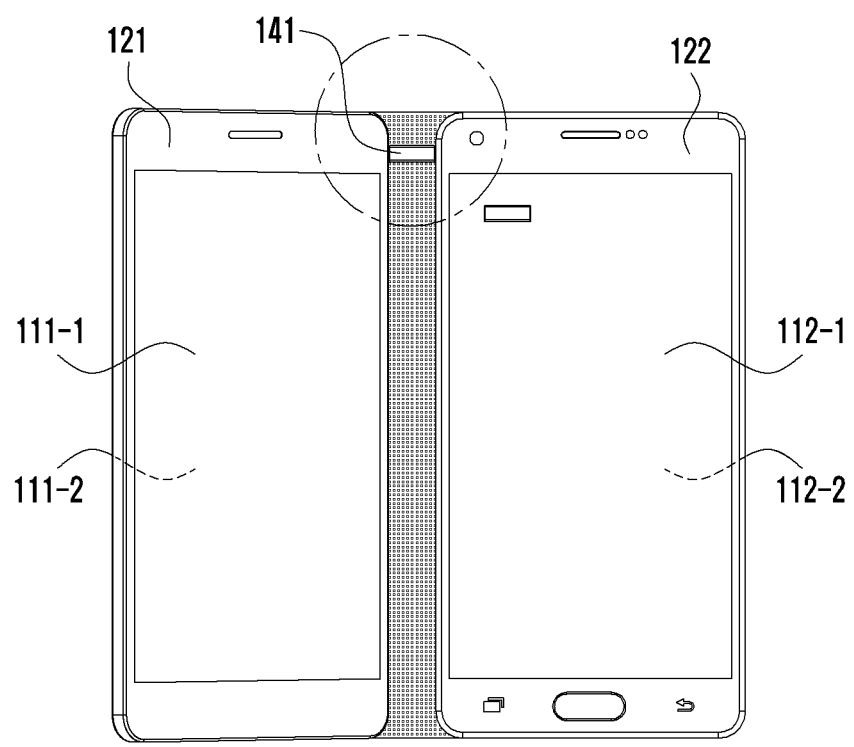

Referring to FIG. 13A, a top plan view of the electronic device 100 is shown in a state in which the foldable housing 110, in which the rotation type fixing member 140 is disposed, maintains a predetermined angle. As shown in FIG. 13A, both end portions of a width of the rotation portion 141 of the rotation type fixing member 140 may support one side of the first housing part 111 and one side of the second housing part 112, respectively.

Figure 13B:
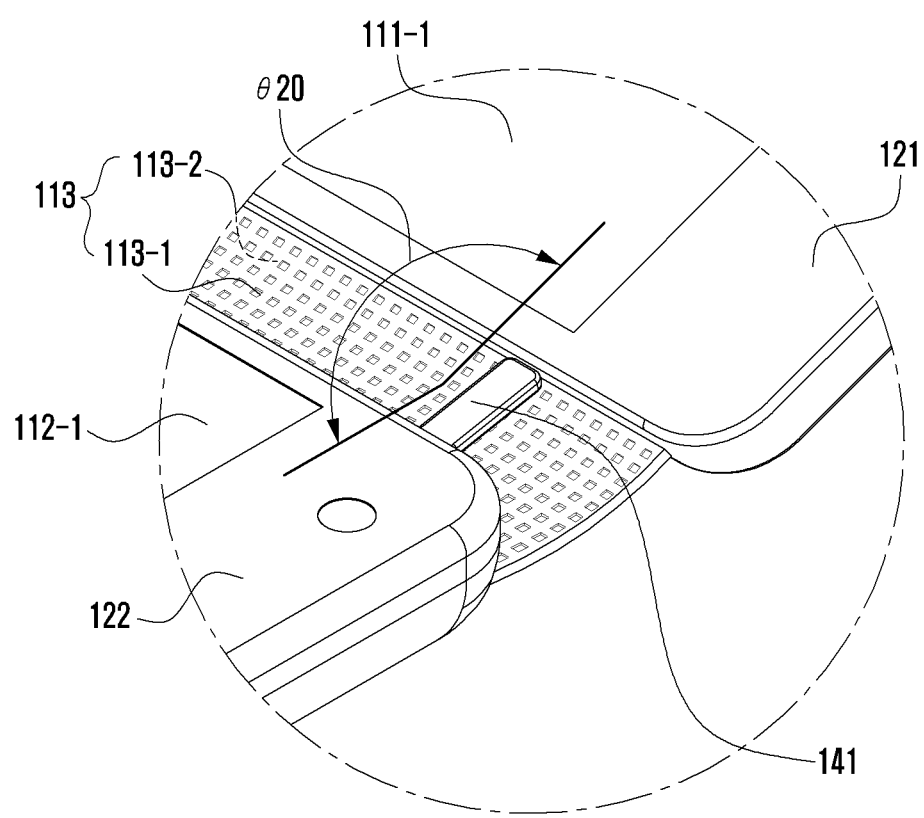

Referring to FIG. 13B, an enlarged perspective partial view of an area including the rotation type fixing member 140. As shown in FIG. 13B, a length of a width of the rotation portion 141 may be less than that of a width of the first surface 113-1 of the connection part 113 facing in the same direction as that of the first surface 111-1 of the first housing 111 and the first surface 112-1 of the second housing 112.

Further, a predetermined angle θ20 maintained by the first surface 111-1 of the first housing part 111 and the first surface 112-1 of the second housing part 112 may be determined according to a width of the rotation portion 141. For example, if a width of the rotation portion 141 increases, a predetermined angle θ20 maintained by the first surface 111-1 of the first housing part 111 and the first surface 112-1 of the second housing part 112 may increase, and if a width of the rotation portion 141 decreases, a predetermined angle θ20 maintained by the first surface 111-1 of the first housing part 111 and the first surface 112-1 of the second housing part 112 may decrease.

Figure 14A:
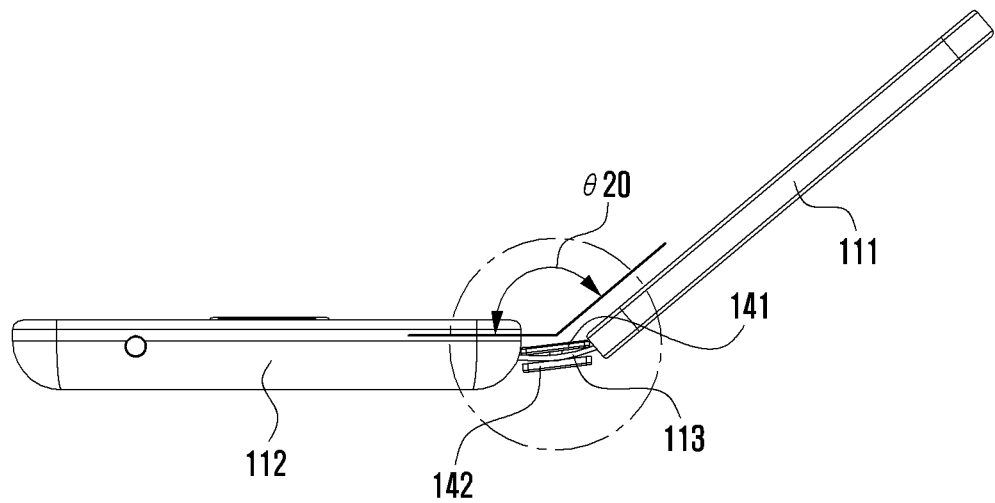

Referring to FIG. 14A, a side view of the electronic device 100 is shown in a state in which the foldable housing 110, in which the rotation type fixing member 140 is disposed, maintains a predetermined angle θ20. As shown in FIG. 14A, the rotation portion 141 and the fastening portion 142 of the rotation type fixing member 140 may be coupled to engage with the connection part 113 interposed therebetween.

Figure 14B:
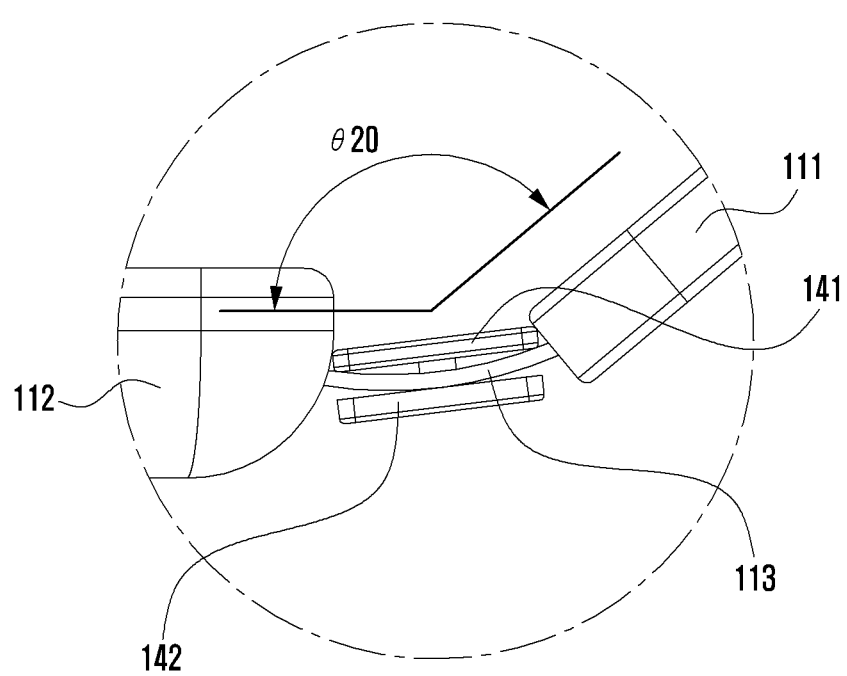

Referring to FIG. 14B, an enlarged partial view of an area including the rotation type fixing member 140 is shown. As shown in FIG. 14B, a width of the rotation portion 141 may be determined in consideration of a restoring force of the connection part 113. If the rotation portion 141 rotates, a predetermined angle θ20 maintained by the first surface 111-1 of the first housing part 111 and the first surface 112-1 of the second housing part 112 may increase; thus, a restoring force of the connection part 113 may gradually increase. In this case, a surface of the connection part 113 under a width may be bent in a form of a bow using a width of the rotation portion 141 as a string. In this case, a restoring force of the connection part 113 may be the same as a tensile force occurring by bending of the connection part 113. In this case, if a surface of the connection part 113 bent in a form of a bow becomes tight, a force in which a restoring force of the connection part 113 and a support force of the rotation portion 141 are in equilibrium increases; thus, the first surface 111-1 of the first housing part 111 and the first surface 112-1 of the second housing part 112 may maintain a predetermined angle θ20. In a state in which a force that enables the foldable housing 110 to maintain a predetermined angle θ20 increases, shaking of the foldable housing 110 by an external force may be minimized. Accordingly, in a situation in which shaking of the foldable housing 110 is minimized, a width of the rotation portion 141 may be determined. The width of the rotation portion 141 may be, for example 0.8 mm to 15 mm. Alternatively, the width of the rotation portion 141 may be, for example 10 mm to 14 mm.

As shown in FIGS. 10A to 10C, in a state in which an external force to the foldable housing 110 is not applied, the rotation type fixing member 140 may be disposed at the connection part 113 in a first state or a second state.

For example, as shown in FIG. 10B, if the rotation type fixing member 140 is in a first state, a width of the rotation portion 141 may be located at the first surface 113-1 of the connection part 113 to be parallel or almost parallel to one side of the first housing part 111 and one side of the second housing part 112. If the rotation type fixing member 140 is in a first state, an angle between one side of the first housing part 111 and one side of the second housing part 112 may maintain a first angle, which is at least one angle θ11 of a selected range. In this case, if the connection part 113 includes the first surface 113-1 to which a tensile force is applied and the second surface 113-2 to which a compressive force is applied, the tensile force applied to the first surface 113-1 and the compressive force applied to the second surface 113-2 may be in equilibrium.

For example, as shown in FIG. 10C, if the rotation type fixing member 140 is in a second state, the rotation portion 141 rotates; thus, a width of the rotation portion 141 may be located at the first surface 113-1 of the connection part 113 to be vertical or almost vertical to one side of the first housing part 111 and one side of the second housing part 112. If the rotation type fixing member 140 is in a second state, an angle between the first surface 111-1 of the first housing part 111 and the first surface 112-1 of the second housing part 112 may maintain a second angle, which is a predetermined angle θ20. The second angle θ20 if the rotation type fixing member 140 is in a second state may be greater than the first angle θ11 if the rotation type fixing member 140 is in a first state. In this case, if the connection part 113 includes the first surface 113-1 to which a support force is applied and the second surface 113-2 to which a restoring force is applied, the support force applied to the first surface 113-1 and the restoring force applied to the second surface 113-2 may be in equilibrium.

Figure 15:
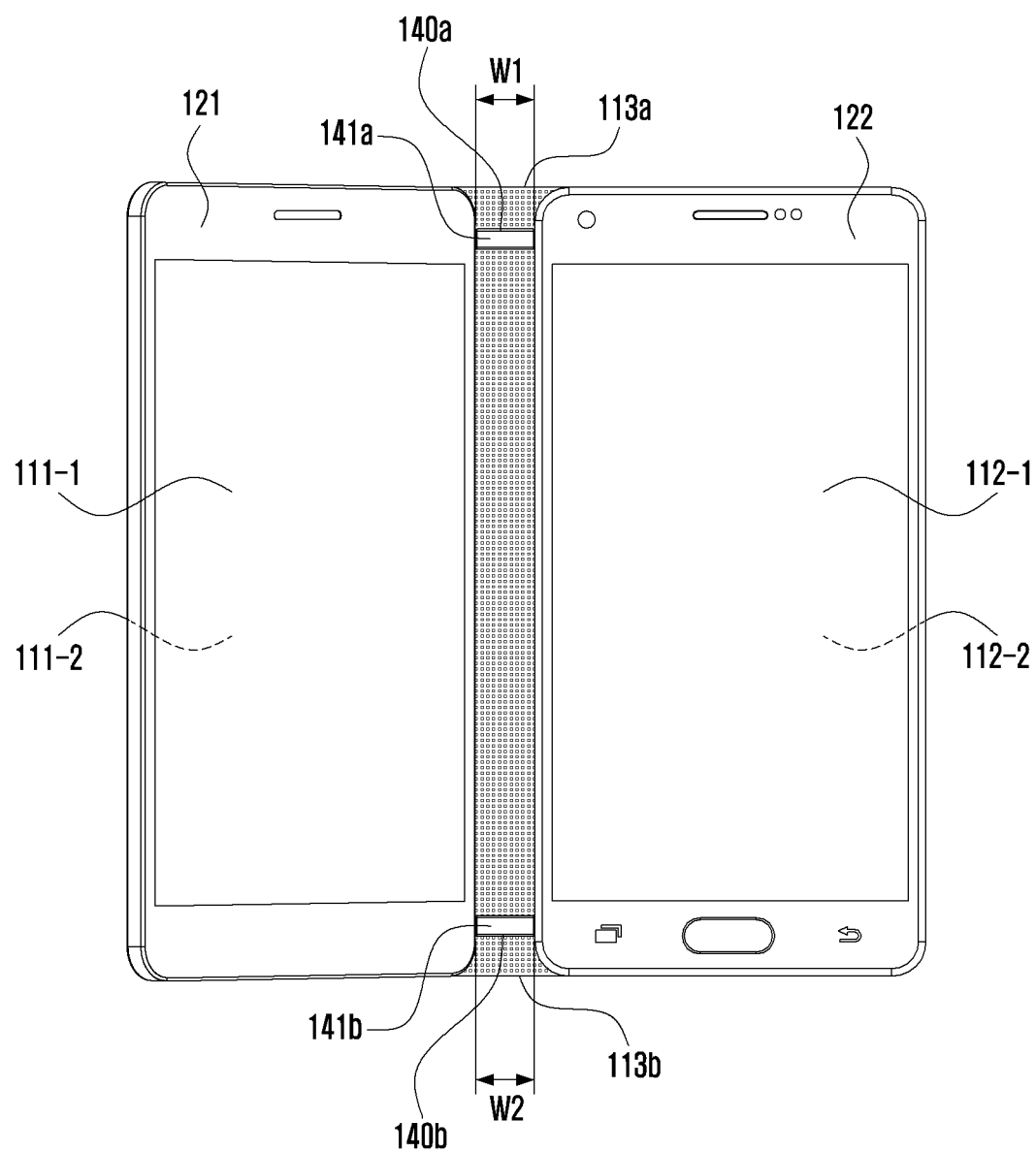

According to an embodiment of the present disclosure, the connection part 113 may have at least one rotation type fixing member 140. In the at least one rotation type fixing member 140, a width of the rotation portion 141 may be differently formed. For example, as shown in FIG. 15, according to an embodiment of the present disclosure, first and second rotation type fixing members 140a and 140b having different widths may be disposed at the upper end portion 113a and the lower end portion 113b, respectively, of the connection part 113. A width of a rotation portion 141a of the first rotation type fixing member 140a disposed at the upper end portion 113a of the connection part 113 may be W1, and a width of the second rotation type fixing member 140b disposed at the lower end portion 113b of the connection part 113 may be W2. The width W1 of the rotation portion 141a of the first rotation type fixing member 140a may be greater than or less than the width W2 of a rotation portion 141b of the second rotation type fixing member 140b.

The first rotation type fixing member 140a in which a width of the rotation portion 141a is W1 may enable maintenance of an unfolded state in an angle θ40, and the second rotation type fixing member 140b in which a width of the rotation portion 141b is W2 may enable maintenance of an unfolded state in an angle θ41.

In an embodiment of the present disclosure, the first rotation type fixing member 140a may be disposed at the upper end portion 113a of the connection part 113, and the second rotation type fixing member 140b may be disposed at a central portion 113c of the connection part 113. Further, the first rotation type fixing member 140a may be disposed at the central portion 113c of the connection part 113, and the second rotation type fixing member 140b may be disposed at the lower end portion 113b of the connection part 113.

In an embodiment of the present disclosure, at least three rotation type fixing members may be disposed.

Figure 16A:
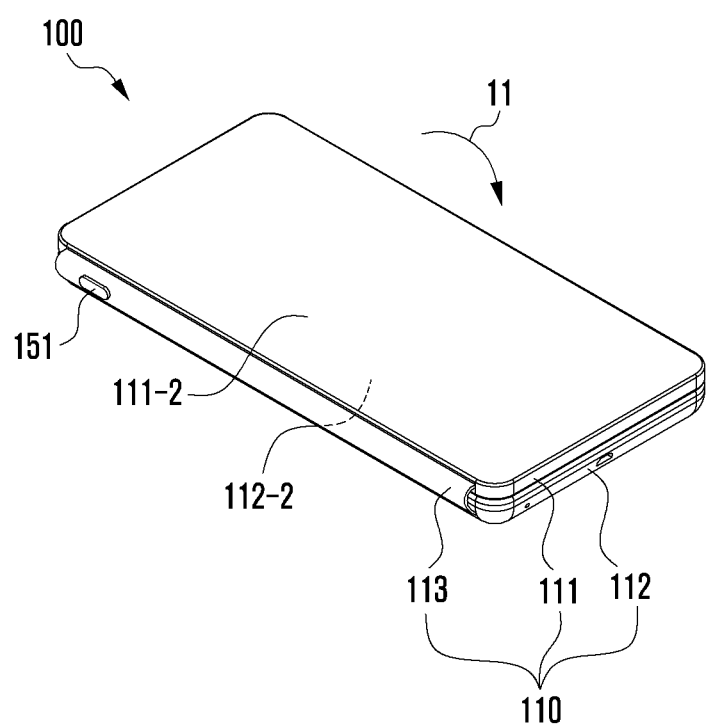
FIGS. 16AA to 17 are perspective views and a diagram of an electronic device in which an automatic fixing member is disposed according to an embodiment of the present disclosure.
Figure 16A:
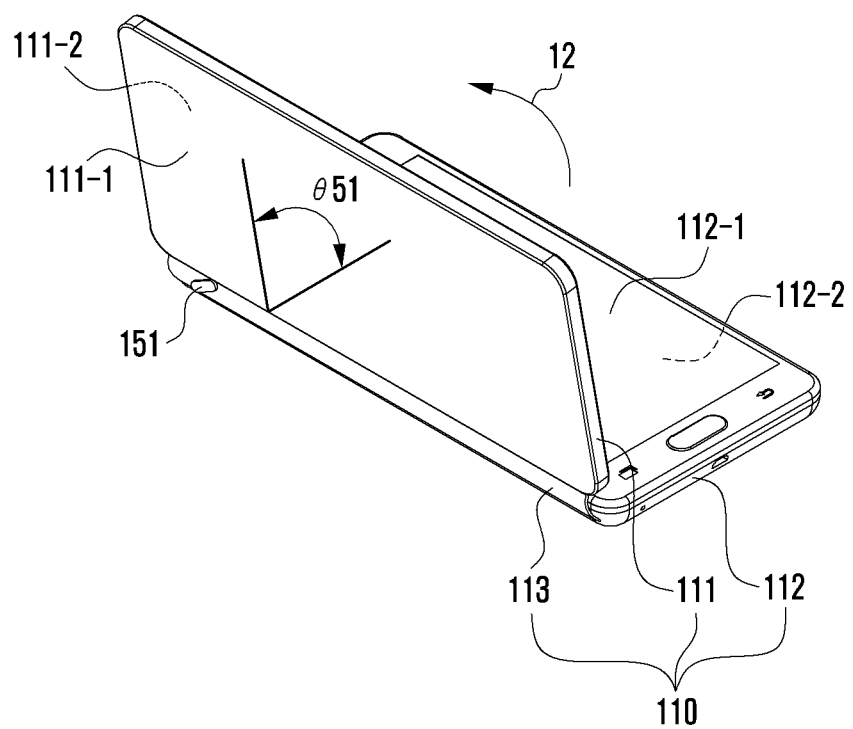

FIGS. 16AA to 16BB are perspective views of an electronic device 100 in which an automatic fixing member 150 is disposed according to various exemplary embodiments of the present disclosure.

Referring to FIGS. 16AA to 16BB, the automatic fixing member 150 may include a rotation portion 151 disposed at a first surface of the connection part 113 of the foldable housing 110 and a power unit that controls the rotation portion 151 to automatically rotate according to opening and closing of the foldable housing 110. If the foldable housing 110 is unfolded in the second direction 12 using a mechanical method, an electrical method, or both methods, the power unit may rotate the rotation portion 151. The power unit may be formed with at least one of, for example, a motor, a power transmission gear, a pen belt, and a rail. A portion of a power unit may be included in the function portion of FIG. 1, and other portions of the power unit may be included in the connection part 113. Power provided to the power unit may be provided from power of the electronic device 100 and may be provided by a user's external force that unfolds the foldable housing 110. Alternatively, power provided to the power unit may be partially provided from both the power of the electronic device 100 and a user's external force.

As an unfolding angle of the foldable housing 110 increases, the rotation portion 151 of the automatic fixing member 150 may automatically rotate. For example, as an unfolding angle of the automatic fixing member 150 increases, the automatic fixing member 150 may automatically rotate by a predetermined angle linearly or non-linearly proportional to the angle. Alternatively, as an unfolding angle of the automatic fixing member 150 increases, the automatic fixing member 150 may automatically rotate step by step by a predetermined angle based on a plurality of threshold values.

FIG. 16AA, illustrates a state in which the first surface 111-1 of the first housing part 111 and the first surface 112-1 of the second housing part 112 face each other if the foldable housing 110 is folded in the first direction 11. In this case, external force from a user may be applied to unfold the foldable housing 110 in the second direction 12.

Referring to FIG. 16AB, an angle between the first surface 111-1 of the first housing part 111 and the first surface 112-1 of the second housing part 112 of the foldable housing 110 may become a first angle θ51.

As shown in FIG. 16AB, the first angle θ51 may be, for example an angle between 80° and 110°. Thereafter, a user may apply an external force to unfold the foldable housing 110 in a second direction.

Figure 16B:
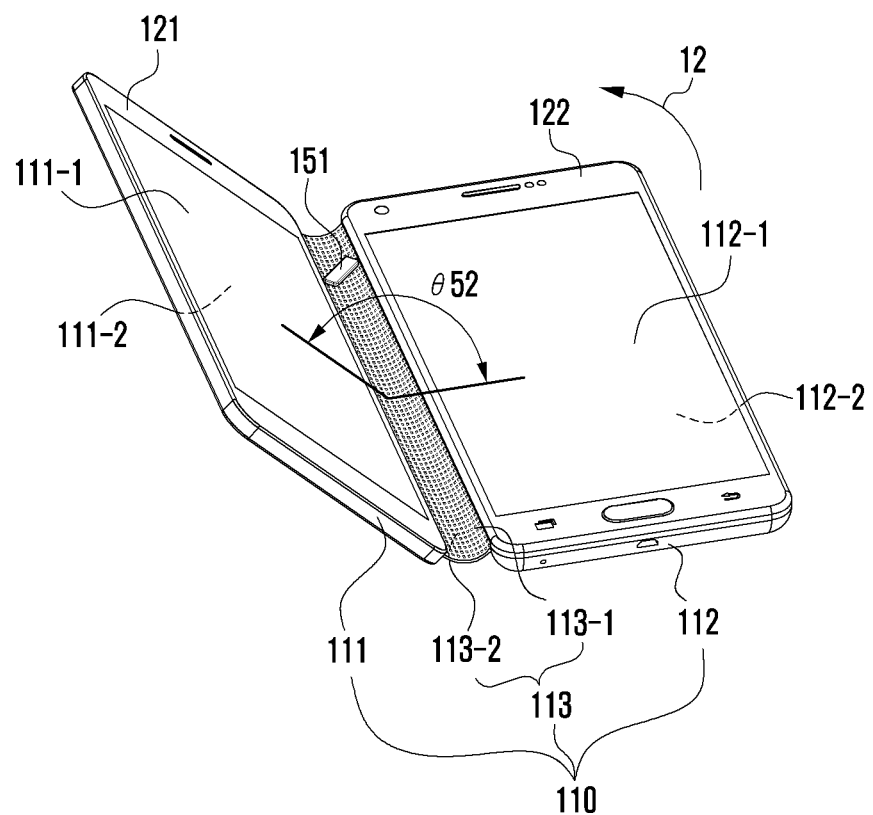
Figure 16B:
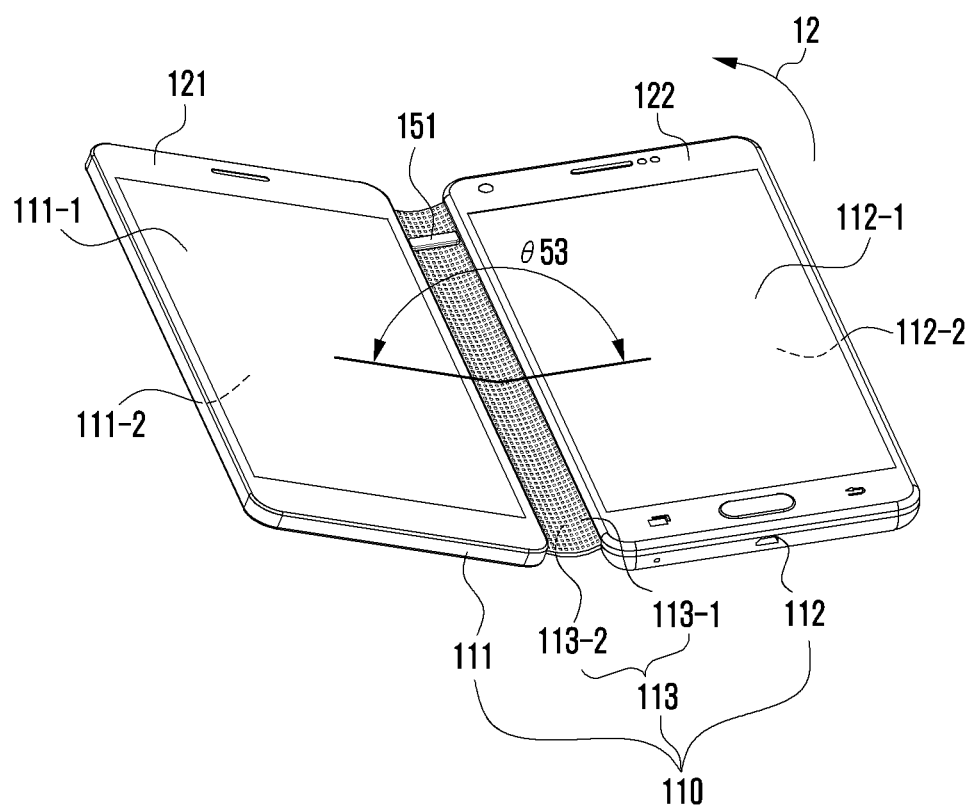

Referring to FIG. 16BA, an angle between the first surface 111-1 of the first housing part 111 and the first surface 112-1 of the second housing part 112 of the foldable housing 110 may become a second angle θ52. The second angle θ52 may be greater than the first angle θ51. The second angle θ52 may be, for example, an angle between 110° and 140°. Thereafter, as shown in FIG. 16BB, a user may apply an external force to unfold the foldable housing 110 in the second direction 12.

Accordingly, as shown in FIG. 16BB, an angle between the first surface 111-1 of the first housing part 111 and the first surface 112-1 of the second housing part 112 of the foldable housing 110 may become a third angle θ53. The third angle θ53 may be greater than the second angle θ52. The third angle θ53 may be, for example, an angle between 140° and 170°.

In this case, the rotation portion 151 of the automatic fixing member 150 may rotate to be vertically or almost vertically disposed to one side of the first housing part 111 and one side of the second housing part 112. The rotation portion 151 may automatically rotate by about 90°, as compared with the state shown in FIG. 16AA. Accordingly, there is an equilibrium between the second surface 113-2 of the connection part 113 that maintains angles of a selected range by a restoring force and the first surface 113-1 of the connection part 113 to which a support force that pushes one side of the first housing part 111 and one side of the second housing part 112 is applied by the automatic fixing member 150; thus, an angle between the first surface 111-1 of the first housing part 111 and the first surface 112-1 of the second housing part 112 may constantly maintain the third angle θ53.

As shown in FIGS. 16AA to 16BB, in a state in which an external force to the foldable housing 110 is not applied, the automatic fixing member 150 may be disposed at the connection part 113 in a first state or a second state.

For example, as shown in FIG. 16AB or 16BA, if the automatic fixing member 150 is in a first state, the automatic fixing member 150 may automatically rotate by a predetermined angle according to a user's external force that unfolds the foldable housing 110. In this case, an angle between the first surface 111-1 of the first housing part 111 and the first surface 112-1 of the second housing part 112 may maintain the first angle θ51 or the second angle θ52.

For example, as shown in FIG. 16BB, if the automatic fixing member 150 is in a second state, the automatic fixing member 150 may automatically rotate to be vertically or almost vertically disposed to one side of the first housing part 111 and one side of the second housing part 112 according to a user's external force that unfolds the foldable housing 110. In this case, an angle between the first surface 111-1 of the first housing part 111 and the second surface 112-1 of the second housing part 112 may maintain the third angle θ53.

According to an embodiment of the present disclosure, the connection part 113 may have at least one automatic fixing member 150. In at least one automatic fixing member 150, a width of the rotation portion 151 may be formed differently.

Figure 17:
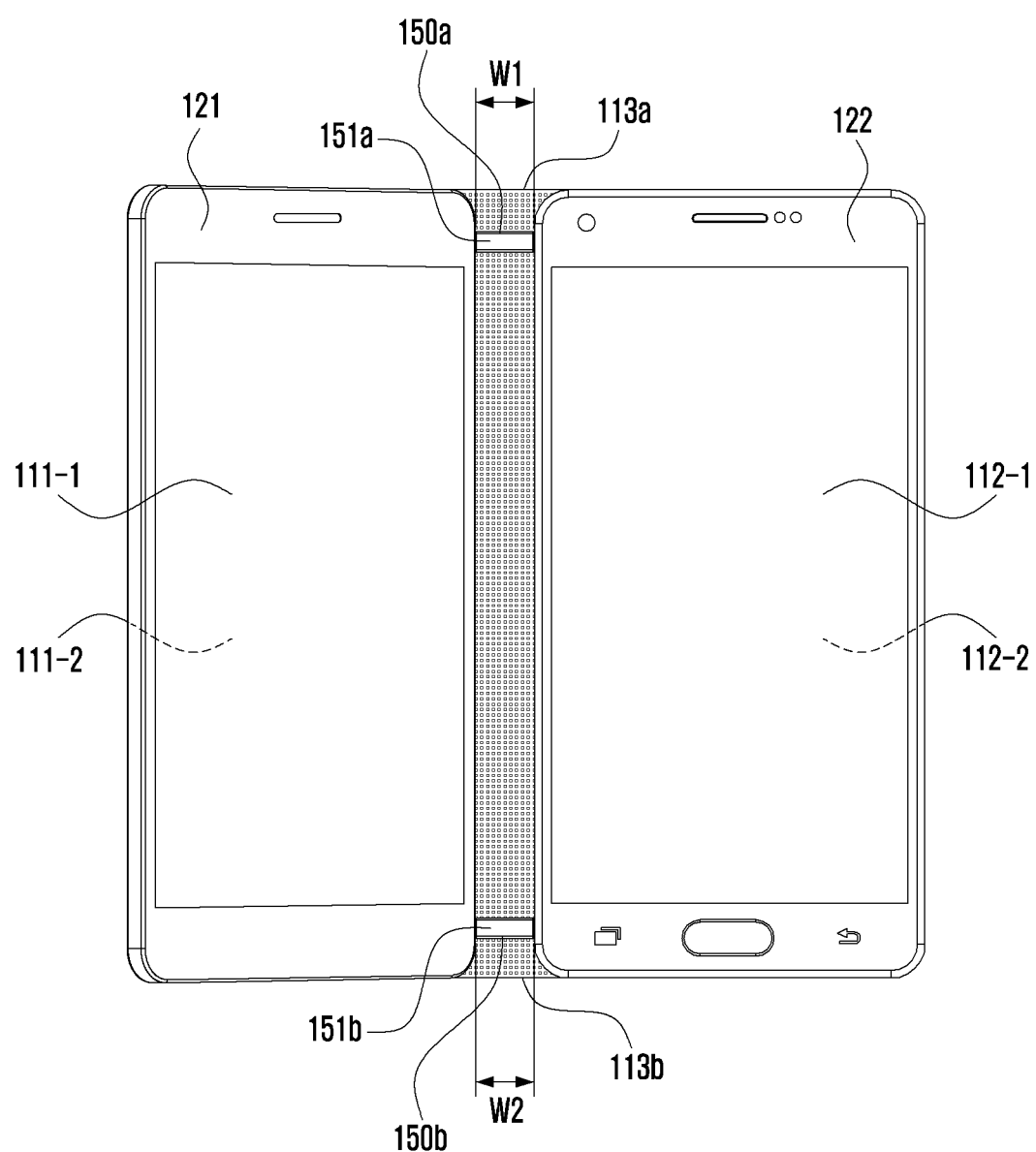

FIG. 17 is a diagram of an electronic device in which an automatic fixing member is disposed according to an embodiment of the present disclosure.

Referring to FIG. 17, two automatic fixing members 150a and 150b having different widths may be disposed at an upper end portion 113a and a lower end portion 113b, respectively, of the connection part 113. A width of the rotation portion 151a of the first automatic fixing member 150a disposed at the upper end portion 113a of the connection part 113 may be W1, and a width of the rotation portion 151b of the second rotation type fixing member 150b disposed at the lower end portion 113b of the connection part 113 may be W2. The width W1 of the rotation portion 151a of the first rotation type fixing member 150a may be greater than or less than the width W2 of the rotation portion 151b of the second rotation type fixing member 150b.

The first automatic fixing member 150a in which a width of the rotation portion 151a is W1 may enable maintenance of an unfolded state in an angle θ60, and the second automatic fixing member 150b in which a width of the rotation portion 151b is W2 may enable maintenance of an unfolded state in an angle θ61.

In an embodiment of the present disclosure, the first automatic fixing member 150a may be disposed at the upper end portion 113a of the connection part 113, and the second automatic fixing member 150b may be disposed at the central portion 113c of the connection part 113. Further, the first automatic fixing member 150a may be disposed at the central portion 113c of the connection part 113, and the second automatic fixing member 150b may be disposed at the lower end portion 113b of the connection part 113.

In an embodiment of the present disclosure, at least three automatic fixing members may be disposed.

FIGS. 18A to 19B are diagrams of a polymer layer in a connection part according to an embodiment of the present disclosure.

Referring to FIGS. 18A to 19B, in a state in which the foldable housing 110 is unfolded, the polymer layer may include a first surface 113-1 facing in the same direction as that in which the first surface 111-1 of the first housing part 111 and the first surface 112-1 of the second housing part 112 face and a second surface 113-2 facing in a direction opposite to that in which the first surface 113-1 faces.

Figure 18A:
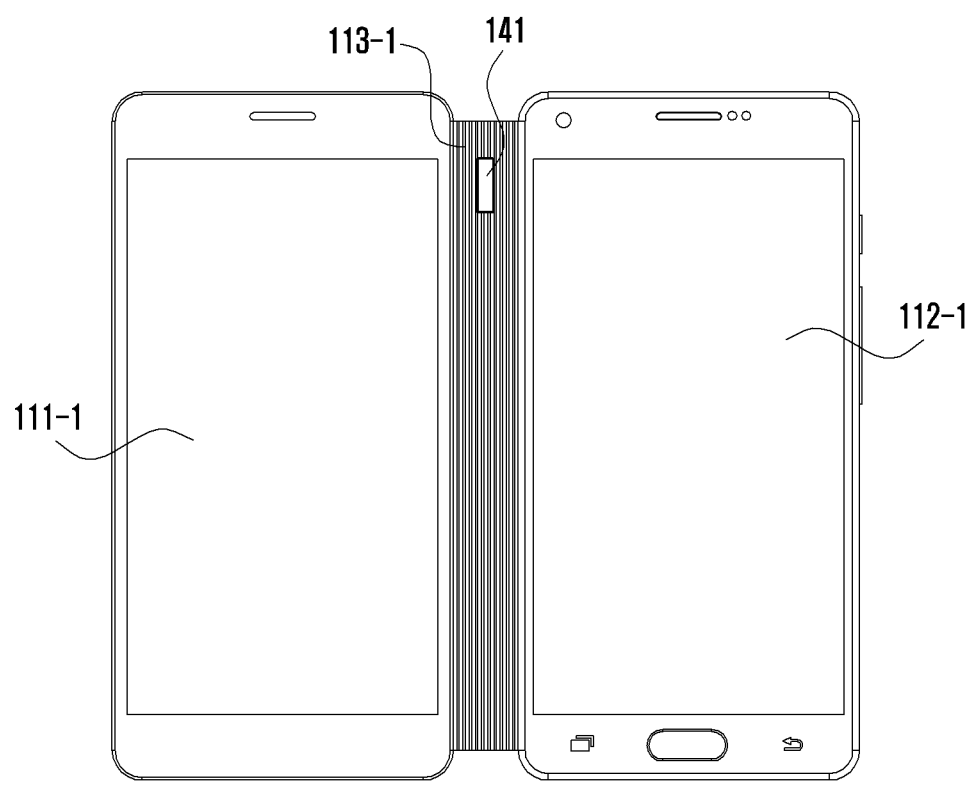
FIGS. 18A to 19B are diagrams of a polymer layer in a connection part according to an embodiment of the present disclosure.

In this case, as shown in FIG. 18A, the first surface 113-1 of the polymer layer may include a plurality of wrinkles extended along at least a portion of one side of the first housing part 111 or at least a portion of one side of the second housing part 112. The plurality of wrinkles may be extended parallel or almost parallel at a predetermined gap or the plurality of wrinkles may be extended while crossing at least one time. Further, the plurality of wrinkles each may be extended without cutting or the plurality of wrinkles each may be extended while being separated at least one time.

Figure 18B:
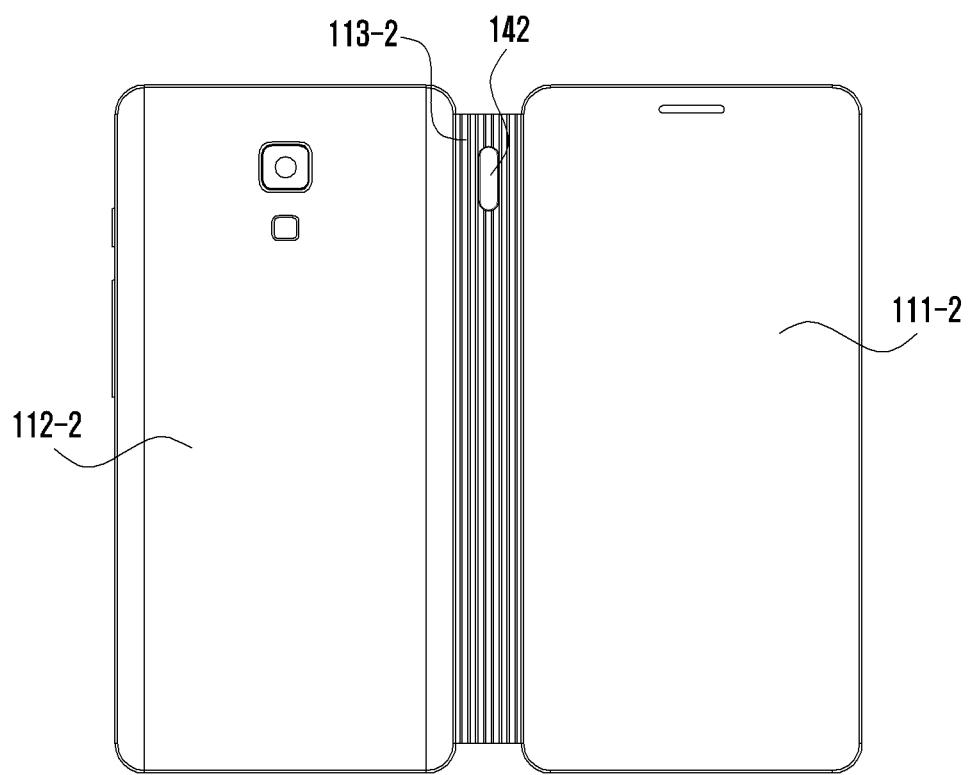

Further, as shown in FIG. 18B, the second surface 113-2 of the polymer layer may include a plurality of wrinkles extended along at least a portion of one side of the first housing part 111 or at least a portion of one side of the second housing part 112. The plurality of wrinkles may be extended parallel or almost parallel at a predetermined gap or the plurality of wrinkles may be extended while crossing at least one time. In this case, a plurality of wrinkles included at the first surface 113-1 of the polymer layer may be formed more densely than a plurality of wrinkles included at the second surface 113-2 of the polymer layer.

Figure 19A:
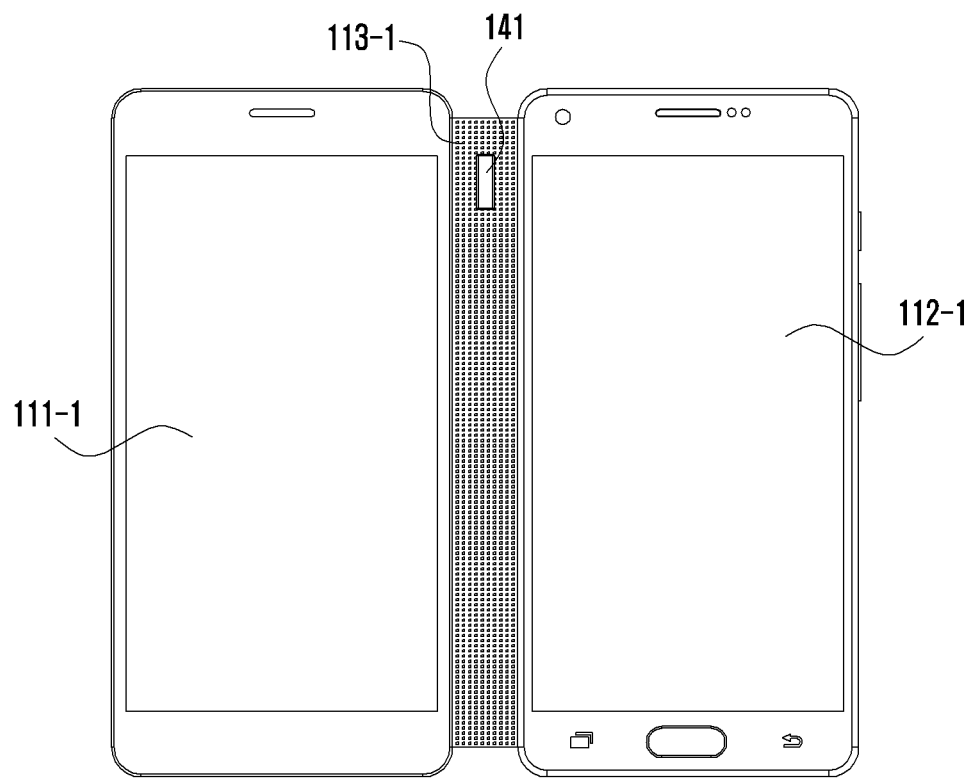

For example, as shown in FIG. 19A, the first surface 113-1 of the polymer layer may include a plurality of dimples. The plurality of dimples may be regularly or irregularly arranged at a predetermined gap. Further, the plurality of dimples may be disposed at the entire or only at a portion of the polymer layer.

Figure 19B:
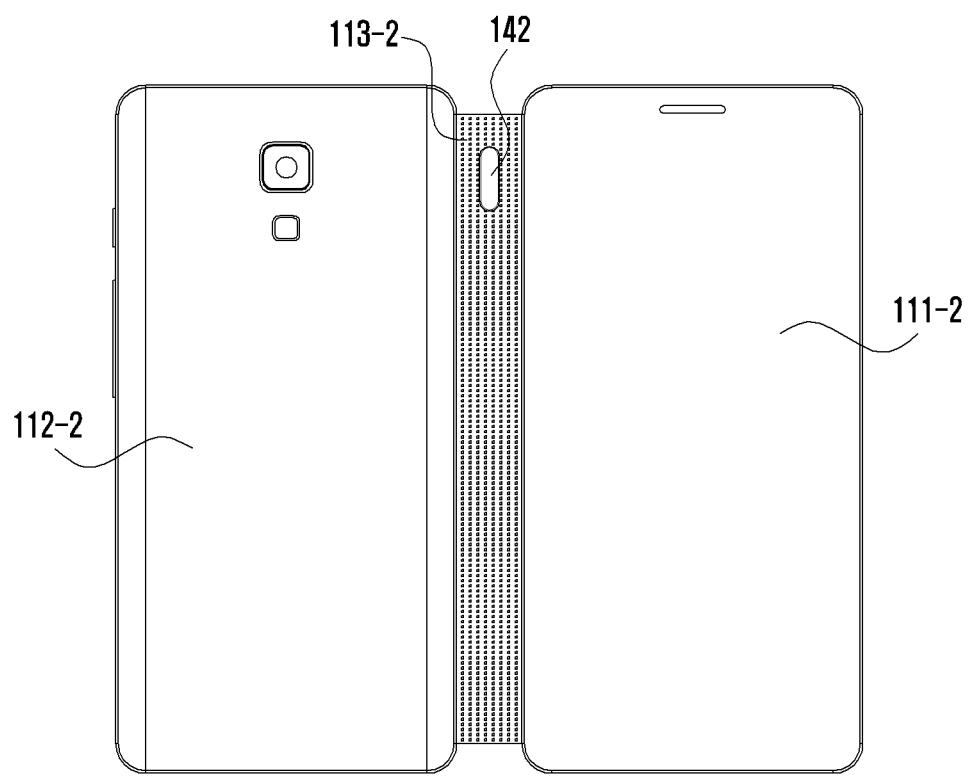

Further, as shown in FIG. 19B, the second surface 113-2 of the polymer layer may include a plurality of dimples. The plurality of dimples may be regularly or irregularly arranged at a predetermined gap. Further, the plurality of dimples may be disposed at the entire or only at a portion of the polymer layer. In this case, a plurality of dimples included at the first surface 113-1 of the polymer layer may be formed more densely than a plurality of dimples included at the second surface 113-2 of the polymer layer.

Further, the first surface 113-1 and the second surface 113-2 of the polymer layer may include various patterns. For example, at the polymer layer, various patterns such as a wave pattern, a zigzag pattern, a polygonal pattern, a wrinkle pattern, a recess, and a protrusion may be applied. In this case, as shown in FIGS. 18A to 19B, density of a pattern included in the first surface 113-1 of the polymer layer and a pattern included in the second surface 113-2 thereof may be different. For example, density of a pattern included in the first surface 113-1 may be greater than that of a pattern included in the second surface 113-2.

In this case, by disposing a pattern or a shape in at least one of the first surface 113-1 and the second surface 113-2 of the polymer layer, flexibility of the polymer layer may be reinforced. That is, if the polymer layer is folded or unfolded, a force applied to the polymer layer is distributed by a pattern or a shape; thus, durability of the polymer layer may be maintained for a long time.

Particularly, by changing a density of a pattern or a shape of the first surface 113-1 and the second surface 113-2 of the polymer layer, flexibility of the first surface 113-1 of the polymer layer and flexibility of the second surface 113-2 of the polymer layer may change. Accordingly, if the polymer layer is folded, a durability difference that occurs because a compressive force applied to the first surface 113-1 of the polymer layer and a tensile force applied to the second surface 113-2 of the polymer layer are different may be compensated by a pattern or a shape.

Figure 20:
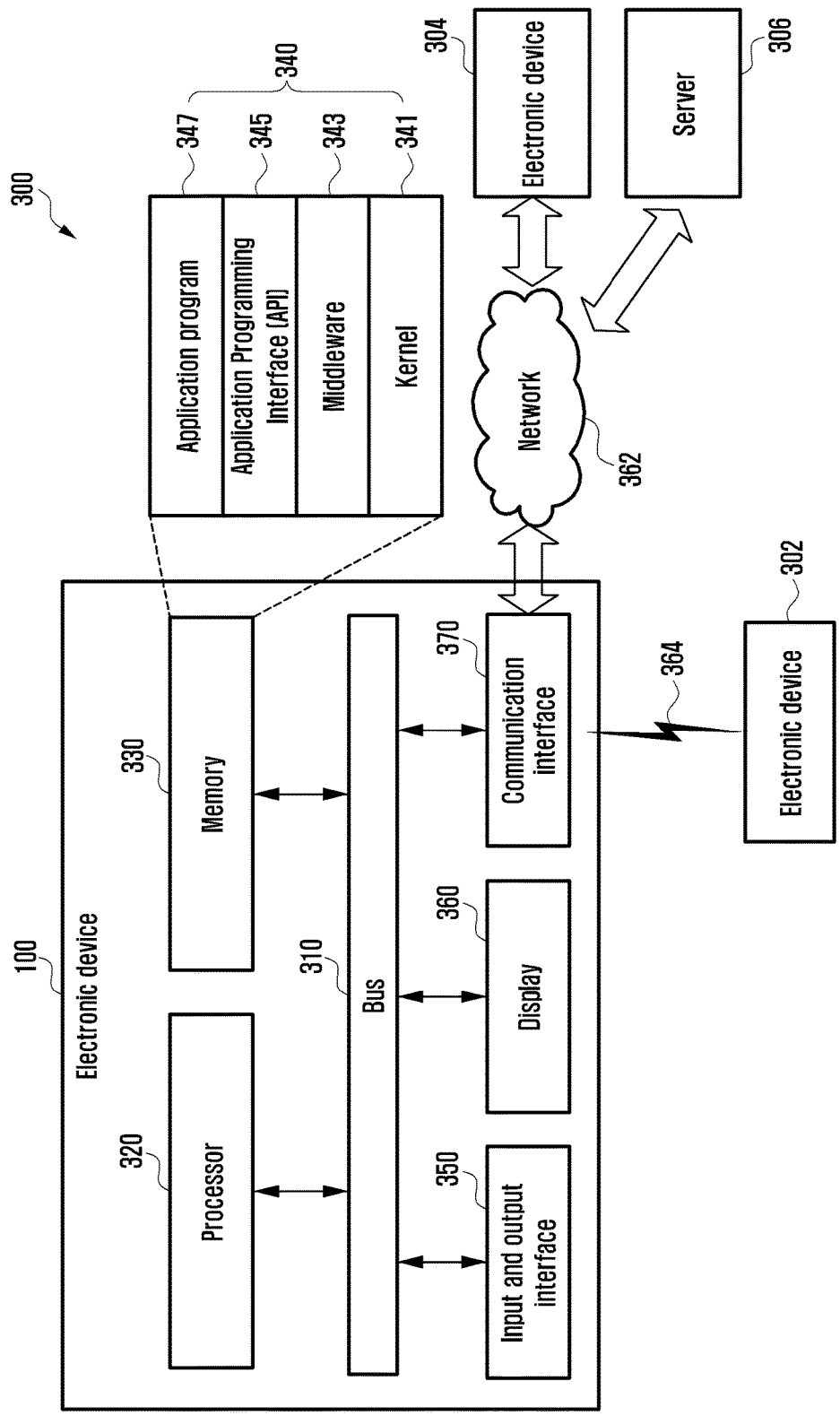
FIG. 20 is a block diagram of an electronic device in a network environment according to an embodiment of the present disclosure.

FIG. 20 is a block diagram of an electronic device 100 in a network environment 300 according to an embodiment of the present disclosure.

Referring to FIG. 20, the electronic device 100 may include a bus 310, a processor 320, a memory 330, an input/output interface 350, a display 360, and a communication interface 370.

The bus 310 may be a circuit connecting the above described components and transmitting communication (for example, a control message) between the above described components.

The processor 320 receives commands from other components (for example, the memory 330, the input/output interface 350, the display 360, and the communication interface 370) through the bus 310, analyzes the received commands, and executes a calculation or processes data according to the analyzed commands.

The memory 330 stores commands or data received from the processor 320 or other components (for example, the input/output interface 350, the display 360, and the communication interface 370) or generated by the processor 320 or other components. The memory 330 may include programming modules 340, for example, a kernel 341, middleware 343, an application programming interface (API) 345, and an application program 347. Each of the aforementioned programming modules 340 may be implemented by software, firmware, hardware, or a combination of two or more thereof.

The input/output interface 350 transmits a command or data input from a user through an input/output device (for example, a sensor, a keyboard, or a touch screen) to the processor 320, the memory 330, and the communication interface 370 through, for example, the bus 310. For example, the input/output interface 350 may provide data on a user's touch input through a touch screen to the processor 320. Further, the input/output interface 350 may output a command or data received through, for example, the bus 310, from the processor 320, the memory 330, and the communication interface 370 through an input/output device (for example, a speaker or a display). For example, the input/output interface 350 may output voice data processed through the processor 320 to a user through a speaker.

The display 360 displays various pieces of information (for example, multimedia data, text data, or the like) for a user.

The communication interface 370 establishes communication between the electronic device 100 and an external device (for example, electronic device 304 or server 306). For example, the communication interface 370 may access a network 362 through wireless or wired communication to communicate with an external device. Wireless communication includes at least one of, for example, wireless fidelity (WiFi), BlueTooth (BT), NFC, GPS, and cellular communication (for example, long term evolution (LTE), LTE advanced (LTE-A), code division multiple access (CDMA), wideband CDMA (WCDMA), universal mobile telecommunications system (UMTS), wireless broadband (WiBro) or global system for mobile communications (GSM)). The wired communication may include at least one of, for example, a universal serial bus (USB), a high definition multimedia interface (HDMI), a recommended standard 232 (RS-232) interface, and a plain old telephone service (POTS).

According to an embodiment of the present disclosure, the network 362 may be a telecommunication network. The telecommunication network includes at least one of a computer network, the Internet, the Internet of Things, and a telephone network. A protocol (for example, a transport layer protocol, a data link layer protocol, or a physical layer protocol) for communication between the electronic device 100 and an external device may be supported by at least one of the application program 347, the API 345, the middleware 343, the kernel 341, and the communication interface 370.

Figure 21:
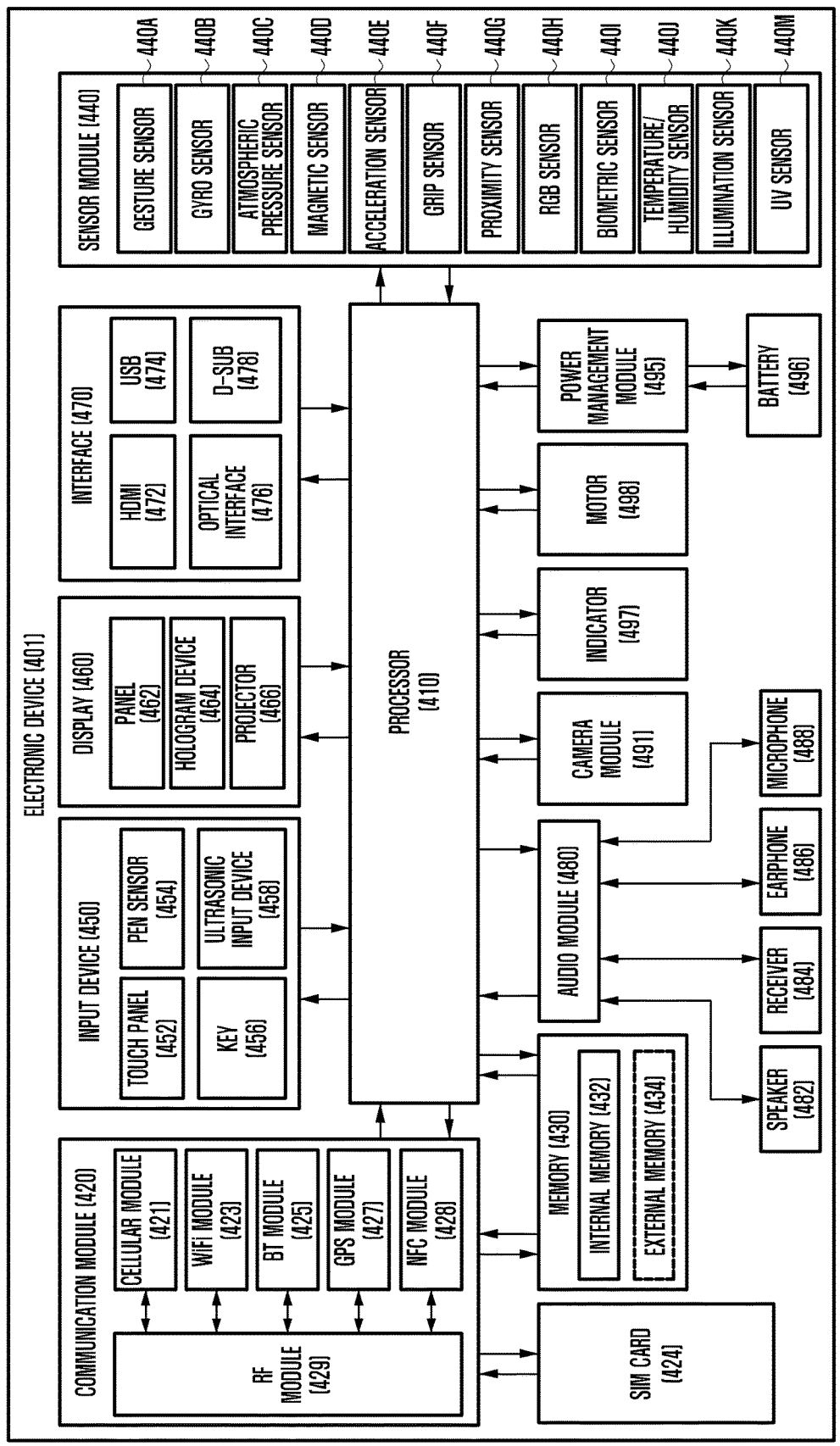
FIG. 21 is a block diagram of an electronic device according to an embodiment of the present disclosure.

FIG. 21 is a block diagram of an electronic device 100 according to an embodiment of the present disclosure.

The electronic device 100 may configure, for example, a whole or a part of the electronic device 100 illustrated in FIG. 20.

Referring to FIG. 21, the electronic device 100 includes one or more processor 410, a communication module 420, a subscriber identification module (SIM) card 424, a memory 430, a sensor module 440, an input device 450, a display 460, an interface 470, an audio module 480, a camera module 491, a power management module 495, a battery 496, an indicator 497, and a motor 498.

The processor 410 operates an operating system (OS) or an application program so as to control a plurality of hardware or software components connected to the processor 410 and execute various data processing and calculations including multimedia data.

The communication module 420 includes a cellular module 421, a WiFi module 423, a BlueTooth (BT) module 425, a GPS module 427, an NFC module 428, and a radio frequency (RF) module 429.

The cellular module 421 provides a voice, a call, a video call, a short message service (SMS), or an Internet service through a communication network (for example, LTE, LTE-A, CDMA, WCDMA, UMTS, WiBro, GSM, or the like). Further, the cellular module 421 may distinguish and authenticate electronic devices within a communication network by using the SIM card 424. According to an embodiment of the present disclosure, the cellular module 421 performs at least some of the functions which may be provided by the processor 410. For example, the cellular module 421 may perform at least some of the multimedia control functions.

Each of the WiFi module 423, the BT module 425, the GPS module 427, and the NFC module 428 may include, for example, a processor for processing data transmitted/received through the corresponding module.

The RF module 429 transmits/receives data, for example, an RF signal. The RF module 429 may include, for example, a transceiver, a power amplifier module (PAM), a frequency filter, a low noise amplifier (LNA) or the like. Further, the RF module 429 may further include a component for transmitting/receiving electronic waves over the air in free space in wireless communication, for example, a conductor, a conducting wire, or the like. Although the cellular module 421, the WiFi module 423, the BT module 425, the GPS module 427, and the NFC module 428 share the RF module 429 in FIG. 21, at least one of the cellular module 421, the WiFi module 423, the BT module 425, the GPS module 427, and the NFC module 428 may transmit/receive an RF signal through a separate RF module according to an embodiment of the present disclosure.

The SIM card 424 may be inserted into a slot formed in a predetermined portion of the electronic device 100. The SIM card 424 includes unique identification information (for example, an integrated circuit card identifier (ICCID)) or subscriber information (for example, an international mobile subscriber identity (IMSI)).

The memory 430 may include an internal memory 432 or an external memory 434. The internal memory 432 may include, for example, at least one of a volatile memory (for example, a random access memory (RAM), a dynamic RAM (DRAM), a static RAM (SRAM), a synchronous dynamic RAM (SDRAM), and the like), and a non-volatile memory (for example, a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a NAND flash memory, a NOR flash memory, and the like).

The external memory 434 may further include a flash drive, for example, a compact flash (CF) drive, a secure digital (SD) drive, a micro SD (Micro-SD) drive, a mini SD (Mini-SD) drive, an extreme digital (xD) drive, or a memory stick. The external memory 434 may be functionally connected to the electronic device 100 through various interfaces.

The sensor module 440 measures a physical quantity or detects an operation state of the electronic device 100, and converts the measured or detected information to an electrical signal. The sensor module 440 may include, for example, at least one of a gesture sensor 440A, a gyro sensor 440B, an atmospheric pressure (barometric) sensor 440C, a magnetic sensor 440D, an acceleration sensor 440E, a grip sensor 440F, a proximity sensor 440G, a color sensor 440H (for example, a red, blue, green (RGB) sensor), a biometric sensor 440I, a temperature/humidity sensor 440J, an illumination (light) sensor 440K, and an ultra violet (UV) light sensor 440M. Additionally or alternatively, the sensor module 440 may include, for example, an electronic nose (E-nose) sensor, an electromyography (EMG) sensor, an electroencephalogram (EEG) sensor, an electrocardiogram (ECG) sensor, an infrared (IR) sensor, an iris sensor, a fingerprint sensor, and the like. The sensor module 440 may further include a control circuit for controlling one or more sensors included in the sensor module 440

The input device 450 includes a touch panel 452, a (digital) pen sensor 454, a key 456, and an ultrasonic input device 458. For example, the touch panel 452 may recognize a touch input in at least one of a capacitive type, a resistive type, an infrared type, and an acoustic wave type. The touch panel 452 may further include a control circuit. In the capacitive type, the touch panel 452 may recognize a proximity of a touch as well as a direct touch. The touch panel 452 may further include a tactile layer. In this case, the touch panel 452 provides a tactile reaction to a user.

The (digital) pen sensor 454 may be implemented, for example, using a method identical or similar to a method of receiving a touch input of a user, or using a separate recognition sheet. The key 456 may include, for example, a physical button, an optical key, or a key pad. The ultrasonic input device 458 is a device which may detect an acoustic wave by a microphone 488 of the electronic device 100 through an input means generating an ultrasonic signal to identify data and may perform wireless recognition.

The display 460 (for example, the display 360 of FIG. 20) includes a panel 462, a hologram device 464, and a projector 466. The panel 462 may be, for example, a liquid crystal display (LCD) or an active organic light emitting diode (AM-OLED). The panel 462 may be implemented to be, for example, flexible, transparent, or wearable. The panel 462 may be configured by the touch panel 452 and one module. The hologram device 464 shows a stereoscopic image in the air by using the interference of light. The projector 466 projects light on a screen to display an image. For example, a screen may be located internally or externally to the electronic device 100. According to an embodiment of the present disclosure, the display 460 may further include a control circuit for controlling the panel 462, the hologram device 464, and the projector 466.

The interface 470 includes, for example, an HDMI 472, a USB 474, an optical interface 476, and a D-subminiature (D-sub) connector 478. The interface 470 may be included in, for example, the communication interface 370 illustrated in FIG. 20. Additionally or alternatively, the interface 470 may include, for example, a mobile high-definition link (MHL) interface, an SD card/multi-media card (MMC), or an Infrared Data Association (IrDA) standard interface.

The audio module 480 bi-directionally converts sound and an electrical signal. At least some components of the audio module 480 may be included in, for example, the input/output interface 350 illustrated in FIG. 20. The audio module 480 processes sound information input or output through, for example, a speaker 482, a receiver 484, an earphone 486, the microphone 488, or the like.

The camera module 491 is a device which MAY photograph a still image and record a video. According to an embodiment of the present disclosure, the camera module 491 may include one or more image sensors (for example, a front sensor or a back sensor), an image signal processor (ISP) or a flash (for example, an LED or a xenon lamp).

The power management module 495 manages power of the electronic device 100. The power management module 495 may include, for example, a power management integrated circuit (PMIC), a charger integrated circuit (IC), or a battery gauge.

The indicator 497 shows predetermined statuses of the electronic device 100 or a part (for example, the processor 410) of the electronic device 100, for example, a booting status, a message status, a charging status, and the like. The motor 498 converts an electrical signal to a mechanical vibration. The electronic device 100 may include a processing unit (for example, graphics processing unit (GPU)) for supporting a module TV. A processing unit for supporting mobile TV may process, for example, media data according to the digital multimedia broadcasting (DMB) standard, the digital video broadcasting (DVB) standard, media flow, or the like.

Each of the components of the electronic device 100 according to an embodiment of the present disclosure may be implemented by one or more components and the name of the corresponding component may vary depending on a type of the electronic device 100. The electronic device 100 may include at least one of the above described components, where a few of the components may be omitted, or where additional components may be further included. In addition, some of the components of the electronic device 100 may be combined to form a single entity, and thus may equivalently execute functions of the corresponding components before being combined.

The term "module" used in the present disclosure may refer to, for example, a unit including at least one combination of hardware, software, and firmware. The term "module" may be interchangeably used with a term, such as "unit," "logic," "logical block," "component," and/or "circuit." The term "module" may indicate a minimum unit of an integrally configured article and/or a part thereof. The term "module" may indicate a minimum unit performing at least one function and/or a part thereof. The term "module" may indicate a device that is mechanically and/or electronically implemented. For example, the term "module" may include at least one of an application specific integrated circuit (ASIC), a field programmable gate array (FPGA), and a programmable-logic device for performing operations which are known and/or will be developed.

According to an embodiment of the present disclosure, at least some of the devices (for example, modules or functions thereof) or the method (for example, operations) may be implemented by a command stored in a non-transitory computer-readable storage medium in the form of a programming module. If instructions are executed by at least one processor (e.g., the processor 410 of FIG. 21), the at least one processor may perform functions corresponding to the instructions. The non-transitory computer-readable storage medium may be, for example, the memory 430 of FIG. 21. At least a part of the programming module may be implemented (for example, executed) by, for example, the processor 410 of FIG. 21. At least some of the programming modules may include, for example, a module, a program, a routine, a set of instructions, or a process for performing one or more functions.

The non-transitory computer-readable recording medium may include magnetic media such as a hard disk, a floppy disk, and a magnetic tape, optical media such as a compact disc ROM (CD-ROM) and a digital versatile disc (DVD), magneto-optical media such as a floptical disk, and hardware devices specially configured to store and perform a program instruction (for example, a programming module), such as a ROM, a RAM, a flash memory, and the like. In addition, program instructions may include high level language code, which may be executed in a computer by using an interpreter, as well as machine code generated by a compiler. The aforementioned hardware device may be configured to operate as one or more software modules in order to perform the operation of the present disclosure, and vice versa.

A module or programming module of the present disclosure may include at least one of the aforementioned components with omission of some components or addition of other components. The operations of the modules, programming modules, or other components may be executed in series, in parallel, recursively, or heuristically. In addition, some operations may be executed in a different order, omitted, or extended with other operations.

The embodiments of the present disclosure described above and illustrated in the accompanying drawings are merely presented to easily describe the present disclosure and facilitate understanding of the present disclosure but are not intended to limit the scope of the present disclosure. Therefore, all changes or modifications derived from the present disclosure are intended to be interpreted to be within the scope of the present disclosure as defined by the appended claims and their equivalents.

What is claimed is:

1. An electronic device, comprising:
   a foldable housing configured to be folded in a first direction or a second direction opposite to the first direction about a connection part, wherein the foldable housing comprises a first housing part comprising a first surface and a second surface opposite to the first surface, a second housing part comprising a third surface facing the first surface of the first housing part in a state folded in the first direction and a fourth surface facing the second surface of the first housing part in a state folded in the second direction, and a flexible connection part that connects at least a portion of one side of the first housing part and at least a portion of one side of the second housing part;
   a first display configured at the first surface of the first housing part;
   a second display configured at the third surface of the second housing part; and
   a fixing member, separate from the connection part and being detachably disposed in a first state or a second state on at least a portion of the connection part,
   wherein the connection part comprises at least one polymer layer in which the first surface of the first housing part and the third surface of the second housing part are formed to maintain at least one angle of a selected range in a state in which an external force to the foldable housing is not applied.

2. The electronic device of claim 1, wherein the connection part further comprises a first polymer layer, a second polymer layer, and a third polymer layer disposed between the first polymer layer and the second polymer layer, wherein
   the third polymer layer is a thermosetting polymer.

3. The electronic device of claim 2, wherein the third polymer layer has a thickness of 0.1 mm to 0.3 mm.

4. The electronic device of claim 1, wherein the connection part further comprises a fifth surface to which a tensile force is applied and a sixth surface to which a compressive force is applied in a state in which an external force to the foldable housing is not applied, and
   a tensile force applied to the fifth surface and a compressive force applied to the sixth surface are in equilibrium, if the first surface of the first housing part and the third surface of the second housing part maintain the at least one angle.

5. The electronic device of claim 1, wherein, in a state in which an external force to the foldable housing is not applied,
   the first surface of the first housing part and the third surface of the second housing part maintain a first angle, if the fixing member is disposed at the connection part in the first state, and
   the first surface of the first housing part and the third surface of the second housing part maintain a second angle, if the fixing member is disposed at the connection part in the second state.

6. The electronic device of claim 5, wherein the first angle is the at least one angle of the selected range.

7. The electronic device of claim 1, wherein the connection part further comprises a seventh surface to which a support force by the fixing member is applied and an eighth surface to which a restoring force is applied to maintain the at least one angle, and
   a support force applied to the seventh surface of the connection part and a restoring force applied to the eighth surface of the connection part are in equilibrium, if the first surface of the first housing part and the third surface of the second housing part maintain a predetermined angle.

8. The electronic device of claim 1, wherein in a state in which the foldable housing is unfolded, the connection part further comprises:
   a ninth surface facing in a same direction as that of the first surface of the first housing part and the third surface of the second housing part; and
   a tenth surface opposite to the first surface,
   wherein a predetermined angle maintained by the first surface of the first housing part and the third surface of the second housing part is determined according to a width of the fixing member disposed at the ninth surface of the connection part.

9. The electronic device of claim 8, wherein the width of the fixing member disposed at the ninth surface of the connection part is about 8 mm to 15 mm.

10. The electronic device of claim 1, wherein the fixing member comprises:
a clip portion disposed at one side of the connection part; and
a ring portion connected to the clip portion to be inserted between one side of the first housing part and one side of the second housing part such that the first surface of the first housing part and the third surface of the second housing part maintain a predetermined angle.

11. The electronic device of claim 1, wherein the fixing member comprises:
a rotation portion configured to rotate between one side of the first housing part and one side of the second housing part such that the first surface of the first housing part and the third surface of the second housing part maintain a predetermined angle; and
a fastening portion that fixes the rotation portion to the connection part.

12. The electronic device of claim 11, wherein the rotation portion is configured to automatically rotate according to an angle in which the foldable housing is unfolded.

13. The electronic device of claim 1, wherein the at least one angle of the selected range is 90° to 180°.

14. The electronic device of claim 1, wherein the at least one angle of the selected range is 120° to 150°.

15. The electronic device of claim 1, wherein the at least one polymer layer comprises:
an eleventh surface facing in a same direction as that of the first surface of the first housing part and the third surface of the second housing part; and
a twelfth surface facing in a direction opposite to the eleventh surface, if the foldable housing is unfolded,
wherein the eleventh surface of the at least one polymer layer comprises a first plurality of wrinkles extended along at least a portion of one side of the first housing part and/or at least a portion of one side of the second housing part.

16. The electronic device of claim 15, wherein the twelfth surface of the at least one polymer layer comprises a second plurality of wrinkles extended along at least a portion of one side of the first housing part and/or at least a portion of one side of the second housing part, and wherein
the first plurality of wrinkles are formed more densely than the second plurality of wrinkles.

17. An electronic device having a foldable housing, comprising:
the foldable housing comprising a first housing part comprising a first surface and a second surface opposite to the first surface, a second housing part comprising a third surface facing in a same direction as that of the first surface of the first housing part and a second surface opposite to the first surface in a state in which the foldable housing is unfolded, and a flexible connection part that connects the first housing part and the second housing part;
a first display configured at the first surface of the first housing part;
a second display configured at the third surface of the second housing part; and
a fixing member, separate from the connection part and being detachably disposed in a first state or a second state on at least a portion of the connection part such that the first surface of the first housing part and the third surface of the second housing part maintain a predetermined angle in a state in which an external force to the foldable housing is not applied.

18. The electronic device of claim 17, wherein, in a state in which the foldable housing is unfolded, the flexible connection part comprises:
a fourth surface facing in a same direction as that of the first surface of the first housing part and the third surface of the second housing part; and
a fifth surface opposite to the fourth surface,
wherein a predetermined angle maintained by the first surface of the first housing part and the third surface of the second housing part is determined according to a width of the fixing member disposed at the first surface of the flexible connection part.

* * * * *